United States Patent
Heller

(10) Patent No.: US 12,461,893 B2
(45) Date of Patent: Nov. 4, 2025

(54) SYSTEM AND METHOD FOR A HASH TABLE AND DATA STORAGE AND ACCESS USING THE SAME

(71) Applicant: 2MISSES CORPORATION, Dike, TX (US)

(72) Inventor: Steve Heller, Dike, TX (US)

(73) Assignee: 2Misses Corp., Dike, TX (US)

(*) Notice: Subject to any disclaimer, the term of this patent is extended or adjusted under 35 U.S.C. 154(b) by 0 days.

(21) Appl. No.: 18/570,505

(22) PCT Filed: Jun. 15, 2022

(86) PCT No.: PCT/US2022/033582
§ 371 (c)(1),
(2) Date: Dec. 14, 2023

(87) PCT Pub. No.: WO2023/278149
PCT Pub. Date: Jan. 5, 2023

(65) Prior Publication Data
US 2024/0281409 A1  Aug. 22, 2024

Related U.S. Application Data

(60) Provisional application No. 63/236,834, filed on Aug. 25, 2021, provisional application No. 63/215,657, filed on Jun. 28, 2021.

(51) Int. Cl.
*G06F 16/10* (2019.01)
*G06F 16/13* (2019.01)
*G06F 16/22* (2019.01)
*G06F 16/2455* (2019.01)
*G06F 16/27* (2019.01)
*G06F 16/17* (2019.01)

(52) U.S. Cl.
CPC ........ *G06F 16/137* (2019.01); *G06F 16/2255* (2019.01); *G06F 16/24564* (2019.01); *G06F 16/278* (2019.01); *G06F 16/1727* (2019.01); *G06F 16/273* (2019.01); *G06F 16/275* (2019.01)

(58) Field of Classification Search
CPC .............. G06F 16/137; G06F 16/1727; G06F 16/2255; G06F 16/24564; G06F 16/273; G06F 16/275; G06F 16/278
See application file for complete search history.

(56) References Cited

U.S. PATENT DOCUMENTS

| 6,886,012 B1* | 4/2005 | Phoenix | G06F 16/2272 707/704 |
| 2006/0116989 A1* | 6/2006 | Bellamkonda | G06F 16/24556 |

(Continued)

OTHER PUBLICATIONS

International Search Report and Written Opinion mailed Oct. 26, 2022 in International Patent Application No. PCT/US22/33582.

*Primary Examiner* — Diedra McQuitery

(57) ABSTRACT

The present teaching relates to method, system, medium, and implementations for storage management. A hash table includes an index file having one or more slots. Each slot has one or more search regions, each of which is of a known size and has one or more buckets. Each bucket can be used to store one or more types of records, including a direct record and an indirect record. A direct record stores data directly as direct data in a bucket of a search region in a slot of the index file when the data satisfies a pre-determined condition.

31 Claims, 37 Drawing Sheets

(56) References Cited

U.S. PATENT DOCUMENTS

| | | | |
|---|---|---|---|
| 2007/0133581 A1* | 6/2007 | Ma | G06F 12/023 |
| | | | 711/E12.006 |
| 2007/0266037 A1* | 11/2007 | Terry | G11B 27/329 |
| 2009/0019345 A1 | 1/2009 | Kaufman et al. | |
| 2011/0307659 A1* | 12/2011 | Hans | H03M 7/3084 |
| | | | 711/E12.001 |
| 2013/0151492 A1* | 6/2013 | Kirihata | G06F 16/134 |
| | | | 707/696 |
| 2016/0253322 A1 | 9/2016 | Li | |
| 2016/0350325 A1* | 12/2016 | Wang | G06F 3/0619 |
| 2017/0286004 A1* | 10/2017 | Hu | G11C 29/74 |
| 2017/0300592 A1 | 10/2017 | Breslow et al. | |
| 2019/0384530 A1 | 12/2019 | Twitto et al. | |

* cited by examiner

| RT 605 | KL 610 | VL 620 | Key 630 | Value 640 |
|---|---|---|---|---|

Fig. 6A

| D | 3 | 4 | h | n | x | q | 0 | 8 | 5 |
|---|---|---|---|---|---|---|---|---|---|

Fig. 6B

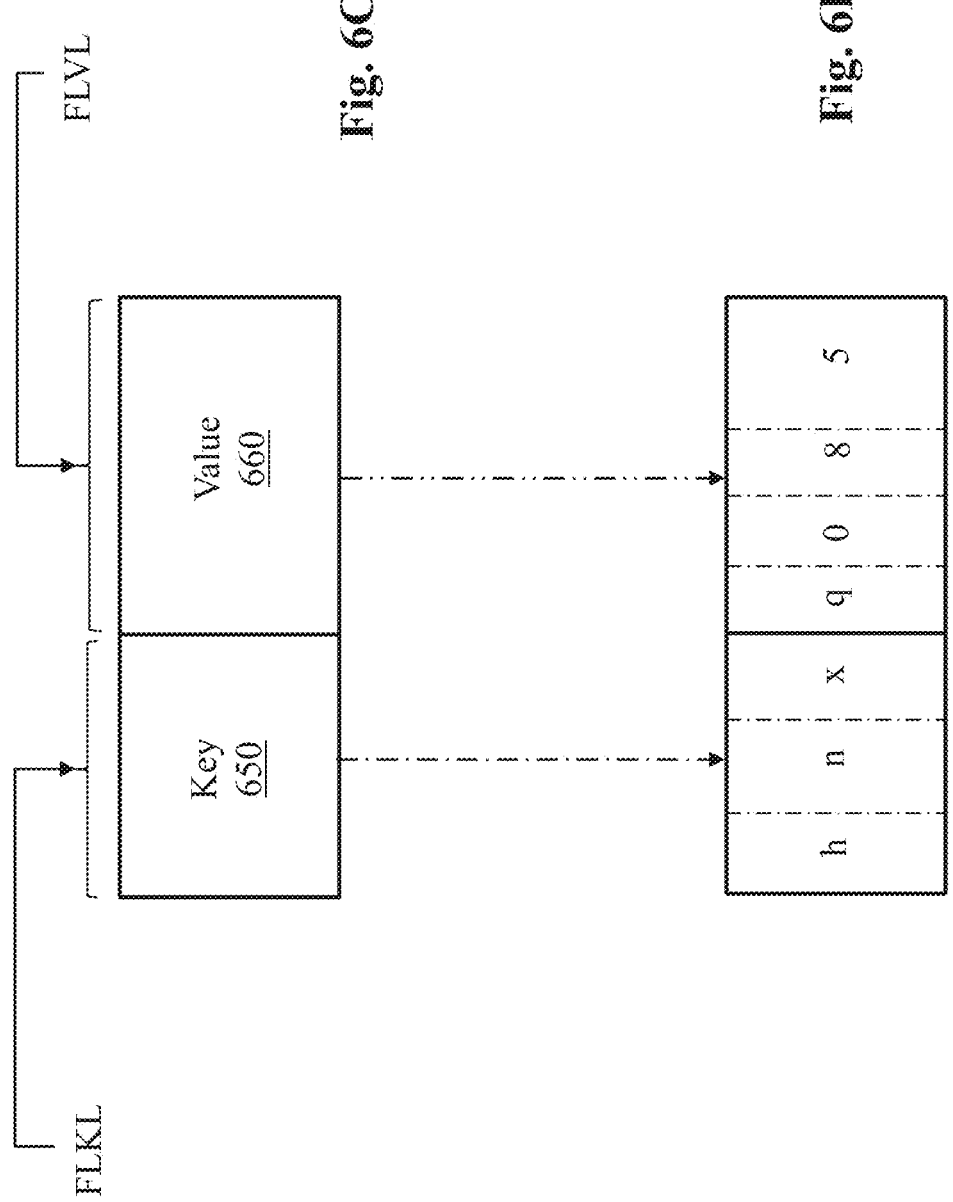

| RT 710 | BSH 720 | BN 730 | Length 740 | Offset 750 |

Fig. 7A

| RT 910 | BSH 920 | SBN 930 |

Fig. 9A

SYSTEM AND METHOD FOR A HASH TABLE AND DATA STORAGE AND ACCESS USING THE SAME

CROSS-REFERENCE TO RELATED APPLICATION

The present application is a U.S. National Stage of International Application No. PCT/US2022/033582, filed on Jun. 15, 2022, which claims the benefit and priority of U.S. Provisional Patent Application No. 63/215,657, filed on Jun. 28, 2021, and U.S. Provisional Patent Application No. 63/236,834, filed on Aug. 25, 2021, both of which are incorporated herein by reference in their entireties.

BACKGROUND

1. Technical Field

The present teaching generally relates to computer storage. More specifically, the present teaching relates to storage management.

2. Technical Background

Computers or computing devices are ubiquitous today. With such widespread usage of computers or computing devices, various applications for all sorts of tasks have been developed. Such applications gather data, process data, and present data. As such, the demand for storing, accessing, and updating a variety of types of data on different kinds of storage is ever-increasing. Although memories, storage devices, and management methods thereof have also been accordingly developed to meet the demand, there are issues remaining that affect the performance of storage operations and to a certain extent become a bottleneck for various applications running on different types of computers or computing devices, whether such storage operations are carried out locally, in the cloud, distributed, or centrally.

One of the foundational techniques used in storage management is hashing, which has been used for decades in the computer industry to enable mapping between data and memory locations where the data are stored to or retrieved from. In general, hashing works in the following manner. Given data subject to a storage operation (either storage or retrieval), a key is computed based on the content of the data to generate a hash code which can be used to locate index information that points to a memory or storage address for the data. A hash table is where a collection of such index information is stored that maps different pieces of data to different locations in the memory or storage.

Different types of hash table have been traditionally used. FIG. 1A illustrates an exemplary open hash table 100. An open hash table may correspond to the simplest form of open hashing. As seen, there are multiple entries in this illustrated open hash table 100 and the second column 110 in each entry of the table defines the head of a linked list. For example, there are two linked lists illustrated in FIG. 1A, namely 120 and 130. All data records that are hashed to a particular entry of the hash table 100 are placed on the linked list associated with that entry. The more data records hashed to the same entry in the hash table, the longer the linked list associated with the entry. Because of the use of a linked list to store the actual records, there are multiple random (at least two) memory or storage accesses in order to reach a data record. In this illustrated example, to access data record with value 9530, two random memory or storage accesses are needed based on linked list 120; while to access data record with value 1057, three random memory or storage accesses are needed based on linked list 130. In general, the more random accesses are needed, the slower the access speed is, and the longer the latency.

FIG. 1B illustrates an exemplary closed hash table 140, which has two columns each of which has a fixed size as shown. Each record in this exemplary closed hash table has two fields, corresponding to the data in the table. Each record with a key value has a home position corresponding to an entry in the closed hash table. The home position is determined based on the underlying hash function. Each entry in the table can store only one value. When there is a collision, i.e., another record is hashed to a home position where another record has been previously hashed or stored, the resolution to the collision is that either the prior record or the new record has to be stored elsewhere based on the collision resolution employed. The same process is also enforced in retrieving a data record. Due to the limited space available to store data records in the table, it is conceivable that a significant fraction of the storage requests have to be resolved via collision resolution, which leads to slow speed and higher latency. In addition, with this closed hash table structure, the space for storing a data record is of equal size for all records, leading to the inability to store variable length records or a significant waste of memory space.

In addition to speed or latency issue, there are other disadvantages with the traditional hash table solutions. A hash table needs to be re-hashed whenever the hash table in its previously created form is no longer suitable because, e.g., it runs out of space during an attempt to add new records to a hash table. Many hash table implementations use a "big-bang" type of rehashing, meaning that when rehashing occurs, it is applied to the entire hash table. This can cause long rehashing delays while adding records, particularly if the hash table holds billions of records.

Furthermore, the data structure of a hash table optimized for DRAM typically relies on pointers that will become invalid if the memory map later has a different base address. This is often the case even during a different run of the same program, because modern operating systems generally assign memory addresses in an arbitrary manner. On top of that, hash table data are typically not compact in memory but stored in numerous locations at arbitrary addresses determined by, e.g., a memory allocator. Such hash tables need to be deserialized on startup and serialized back to storage on exit, further requiring a significant amount of programming effort as well as significant startup and shutdown delays. These problems associated with traditional hash table solutions have become obstacles in today's society where data access is anytime and anywhere and users of computers and computing devices expect instant data access.

Thus, there is a need for an operable hash table design and methods and systems for handling the same that allow more effective solutions to address the shortcomings and challenges of the traditional approaches.

SUMMARY

The teachings disclosed herein relate to methods, systems, and programming for information management. More particularly, the present teaching relates to methods, systems, and programming related to hash table and storage management using the same.

In one example, a method, implemented on a machine having at least one processor, storage, and a communication platform capable of connecting to a network for storage management is disclosed. A hash table is constructed with one or more slots, each of the one or more slots comprising one or more search regions, each of which is of a known size and has one or more buckets. Each bucket stores one or more types of records, including a direct record and an indirect record. A direct record stores data directly as direct data in a bucket of a search region in a slot of the index file when the data satisfies a pre-determined condition. When a storage request associated with relevant data is received, the storage request is handled based on the hash table.

In a different example, a hash table is disclosed for supporting storage management. A hash table includes an index file having one or more slots. Each slot has one or more search regions, each of which is of a known size and has one or more buckets. Each bucket can be used to store one or more types of records, including a direct record and an indirect record. A direct record stores data directly as direct data in a bucket of a search region in a slot of the index file when the data satisfies a pre-determined condition.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for storage management. The information, when read by the machine, causes the machine to perform the following steps. A hash table is constructed with one or more slots, each of the one or more slots comprising one or more search regions, each of which is of a known size and has one or more buckets. Each bucket stores one or more types of records, including a direct record and an indirect record. A direct record stores data directly as direct data in a bucket of a search region in a slot of the index file when the data satisfies a pre-determined condition. When a storage request associated with relevant data is received, the storage request is handled based on the hash table.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6A depicts an exemplary structure of a direct record in a bucket of a slot in a 2-M hash table, in accordance with an exemplary embodiment of the present teaching;

FIG. 6B provides an example direct record in a bucket of a slot in a 2-M hash table, in accordance with an exemplary embodiment of the present teaching;

FIG. 6C is an exemplary structure of a fixed-length-record with designated key length and value length specified in a global record, in accordance with an exemplary embodiment of the present teaching;

FIG. 6D provides an exemplary fixed-length-record in a bucket designated for fixed-length records in a 2-M hash table, in accordance with an exemplary embodiment of the present teaching;

FIG. 7A depicts an exemplary structure of a short indirect record in a bucket of a slot in a 2-M hash table, in accordance with an exemplary embodiment of the present teaching;

FIG. 9A depicts an exemplary structure of a long indirect record in a bucket of a slot in a 2-M hash table, in accordance with an exemplary embodiment of the present teaching;

FIG. 10A depicts an exemplary structure of long indirect data in a block of an overflow file in a 2-M hash table, in accordance with an exemplary embodiment of the present teaching;

FIG. 10B provides example long indirect data in a 2-M hash table, in accordance with an exemplary embodiment of the present teaching;

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching aims to address the deficiencies of the current state of data storage management via an improved 2-Misses or 2-M hash table and management thereof to yield improved performance with a reduced number of cache hostile accesses, elimination of serialization/deserialization of a hash table during start-up and exit, and avoidance of storage access disruption due to rehashing an entire hash table all at once. The enhanced performance in these aspects leads to faster start-up, minimized latency in data processing, and continuity in storage management operations. Different aspects of the 2-M hash table are disclosed below with various embodiments. It is understood that such disclosed embodiments are described for illustration instead of limitations.

Figure 1A:
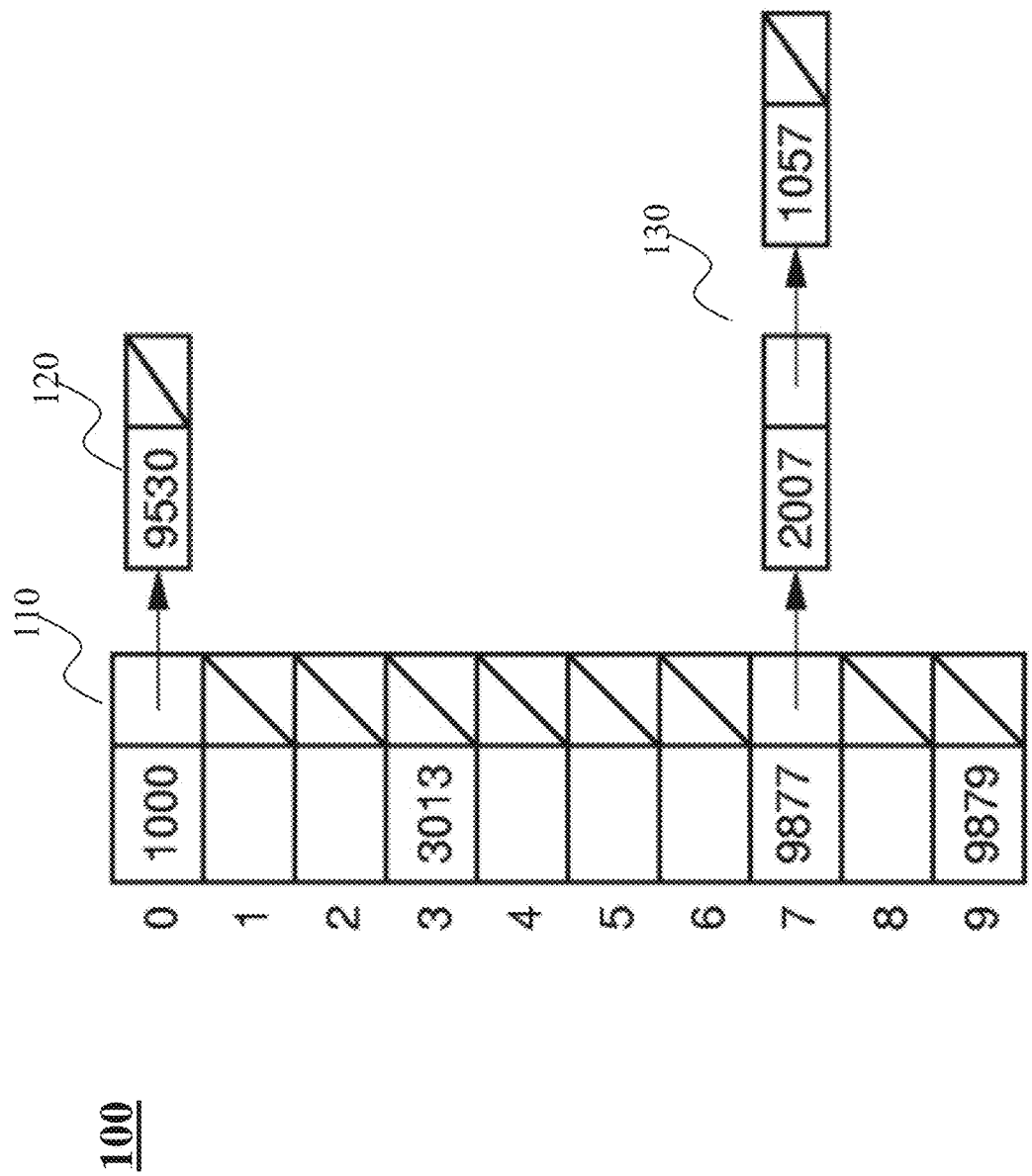
FIG. 1A (PRIOR ART) depicts a traditional open hash table.
Figure 1B:
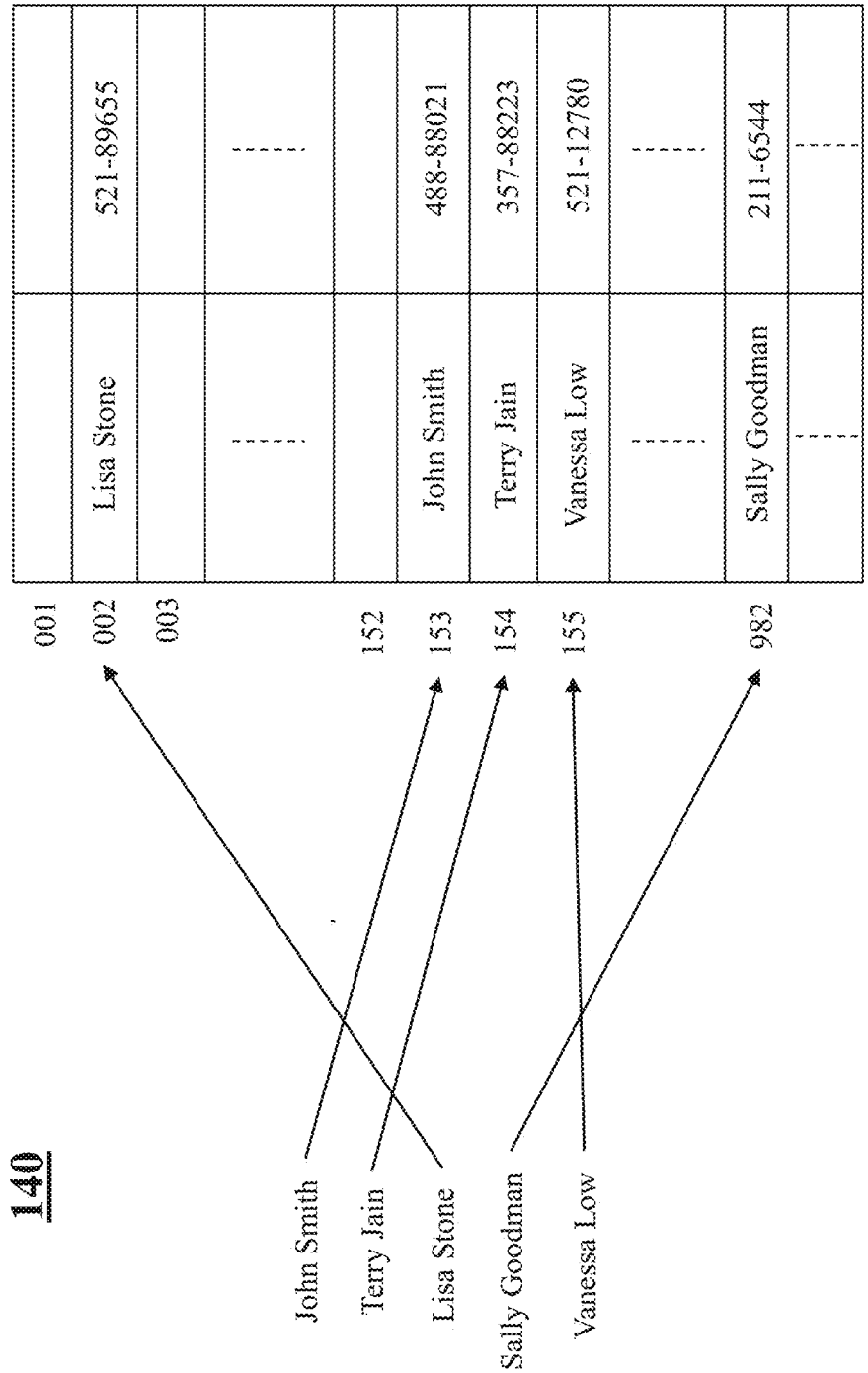
FIG. 1B (PRIOR ART) depicts a traditional closed hash table.
Figure 2:
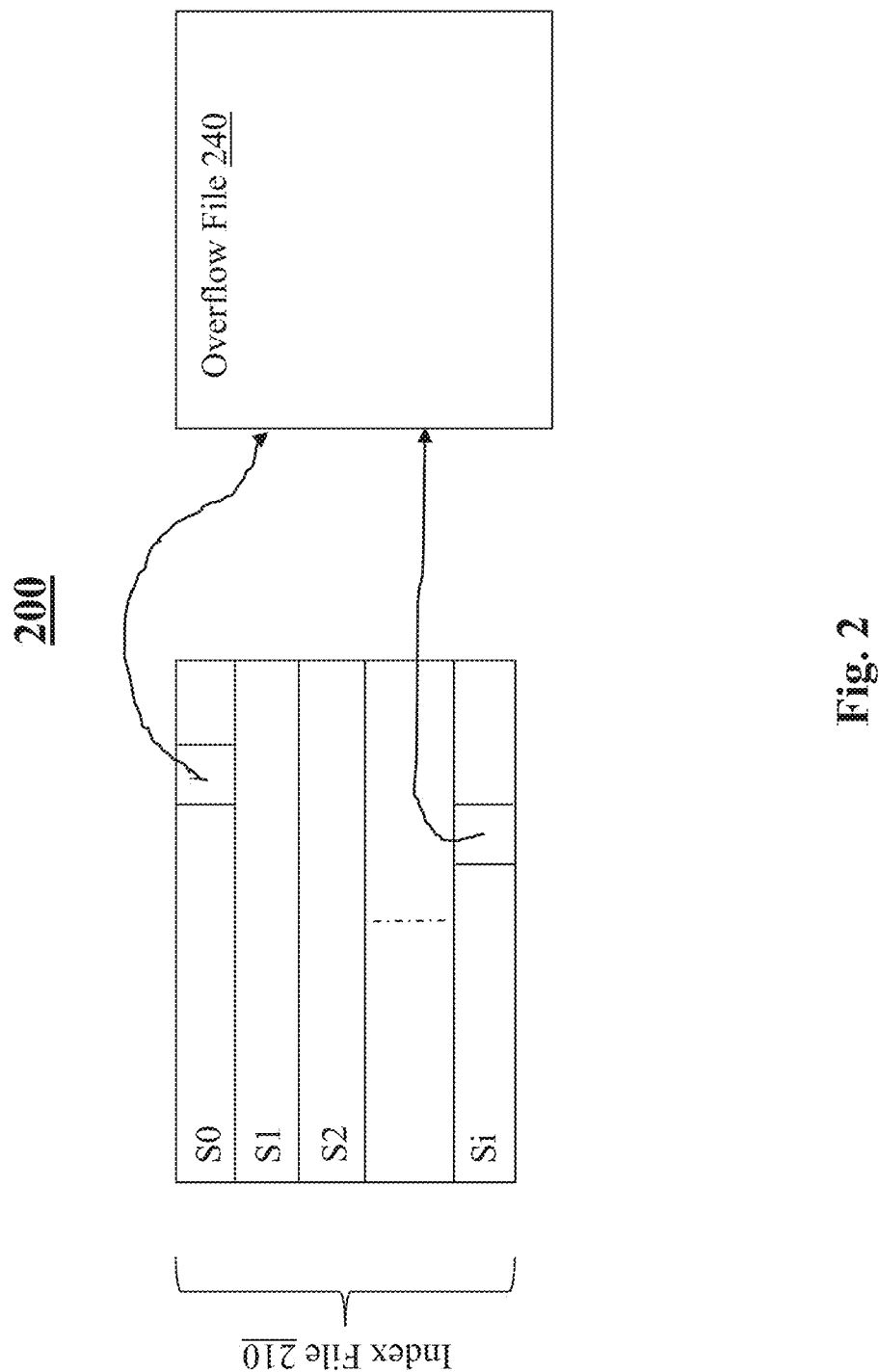
FIG. 2 depicts an exemplary structure of a 2-Misses (2-M) hash table, in accordance with an exemplary embodiment of the present teaching.

FIG. 2 depicts an exemplary structure of a 2-Misses (2-M) hash table 200, in accordance with an exemplary embodiment of the present teaching. The 2-M hash table 200 comprises an index file 210 and an overflow file 240. The index file 210 further comprises one or more slots 220, including S0, S1, S2, . . . , Si. All slots in the index file 220 may be of equal size so that the starting address of any slot may be determined based on the starting address of the first slot S0 and the size of the slots. Such slots may be rehashed when needed. In general, a rehashed slot has a size larger than that of the original slot, e.g., a rehashed slot may have a size double in size as compared with its corresponding original slot. Details related to rehashing are provided with reference to FIG. 11A-FIG. 20.

Figure 3A:
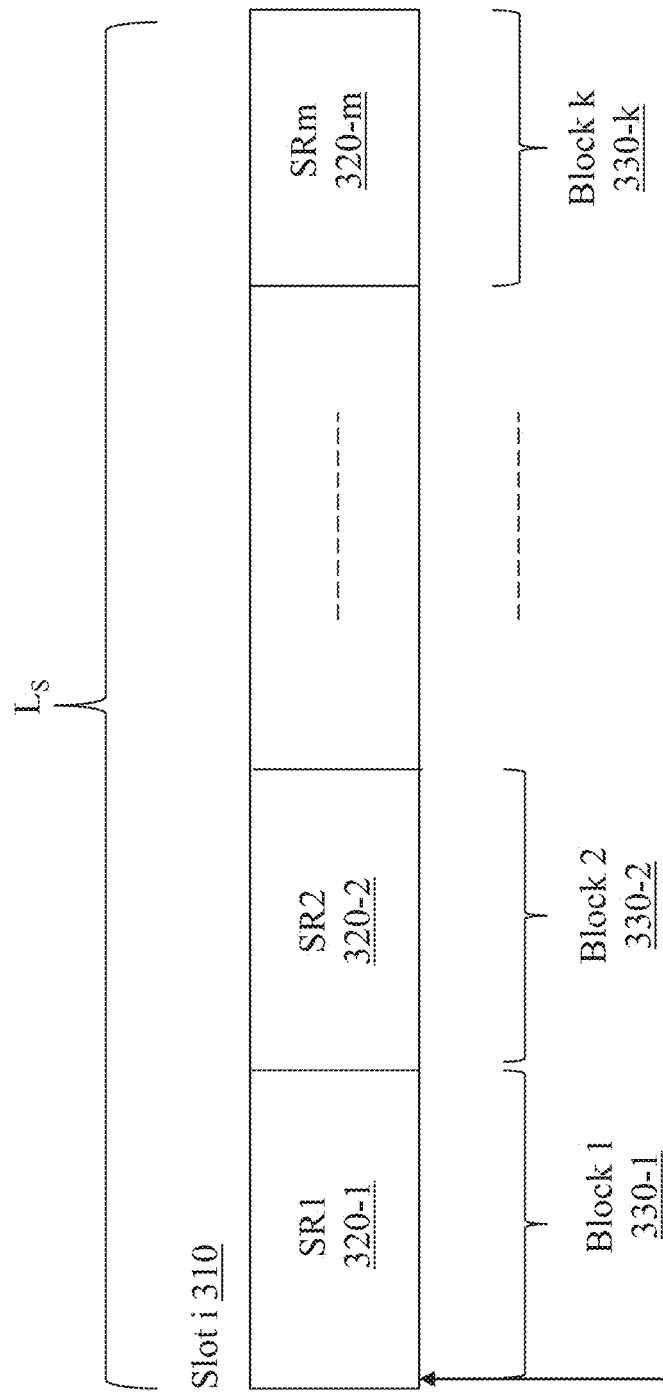
FIG. 3A depicts an exemplary structure of a slot in a 2-M hash table, in accordance with an exemplary embodiment of the present teaching.

Each slot in the index file 210 may be organized in a certain way. In one exemplary embodiment, each slot in a 2-M hash table is structured to have one or more search regions as illustrated in FIG. 3A, in accordance with an embodiment of the present teaching. As shown, an exemplary slot i 310 is of size Ls and has m search regions SR1 320-1, SR2 320-2, . . . SRm 320-$m$. In this illustrated construct, each search region in a slot is of equal size and each search region may occupy a certain number of physical memory or storage blocks. As shown in FIG. 3A, the exemplary slot i 310 occupies k physical memory or storage blocks, from block 1 330-1, . . . , block 2 330-2, . . . , to block k 330-$k$, with a total length Ls=k*B, wherein B is the block size. With this organization of a slot, the starting address of each slot can be determined based on the starting address of the first slot and the known slot size Ls. For instance, the starting address Ai of exemplary slot i 310 can be determined to be (i−1)*Ls+ starting address for the index file of the 2-M hash table.

Figure 3B:
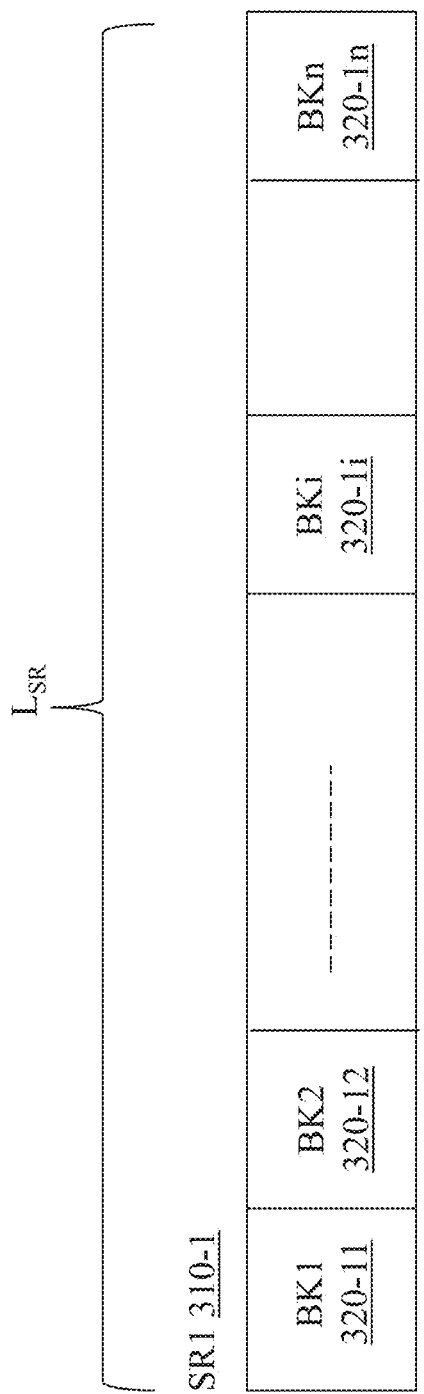
FIG. 3B depicts an exemplary structure of a search region in a 2-M hash table, in accordance with an exemplary embodiment of the present teaching.
Figure 4:
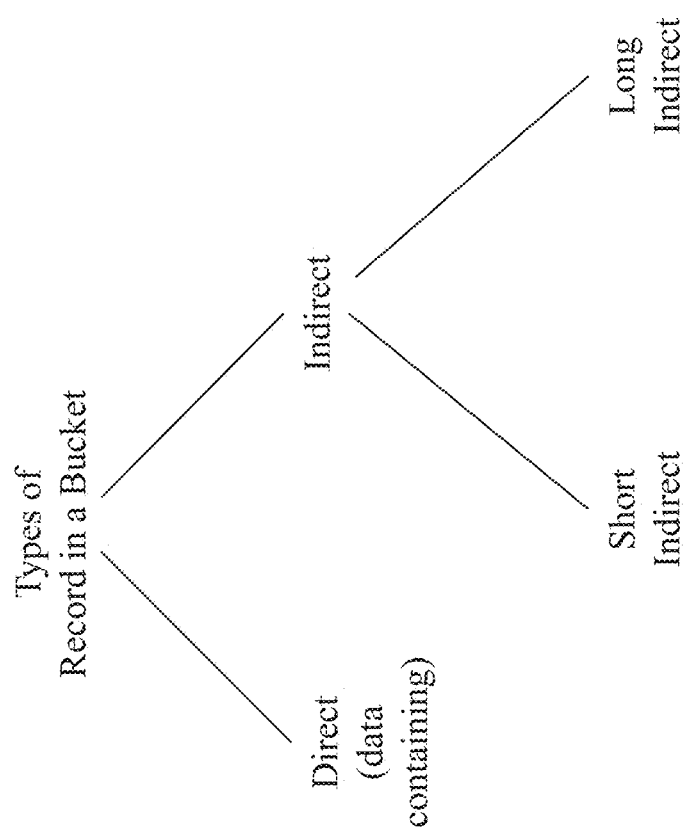
FIG. 4 shows exemplary types of records in a bucket of a slot in a 2-M hash table, in accordance with an exemplary embodiment of the present teaching.

Each search region may further be constructed to include a number of buckets. FIG. 3B provides an exemplary construct of a search region in a 2-M hash table, in accordance with an embodiment of the present teaching. As shown, search region SRi 310-1 of size $L_{SR}$ may include n buckets, BK1 320-11, BK2 320-12, . . . , BKi 320-1$i$, . . . , and BKn 320-1$n$. Each bucket in a search region may be structured to store information. In a 2-M hash table, a bucket may be used to store different types of information, depending on a specific situation. FIG. 4 shows exemplary types of records that can be stored in a bucket of a search region in a slot of a 2-M hash table, in accordance with an exemplary embodiment of the present teaching. A bucket may store a record, which provides information related to the data to be accessed. There may be records of different types. As illustrated in FIG. 4, a bucket may store a record that may be a direct record type, i.e., the data are stored directly in the bucket in the index file 220 of the 2-M hash table. In this case, the data can be stored or retrieved directly from the bucket in the index file without the need to access the overflow file 240. This reduces the number of cache hostile accesses as compared with the traditional open hash table.

The ideal bucket to which a record is allocated can be determined based on a hash code computed for the record. If that bucket has sufficient space to store the record, then the record is stored in that bucket. However, if there is not sufficient space in that bucket to store the record, then collision resolution is needed to determine whether the record will displace another record in that bucket or whether another bucket must be found to store the record. It is generally recognized in the art that the best way to reduce the variance of searching for a record in a closed hash table is to use Robin Hood hashing. However, the existing descriptions of Robin Hood hashing refer only to fixed-length records, so they are not directly applicable to the present teaching and therefore a new variant of this algorithm may be created.

The basic idea of Robin Hood hashing for fixed-length records is that when a record is to be stored, if the ideal bucket for that record is already occupied, a linear search is done for an empty bucket. During that search, whenever the current record in the table is closer to its ideal bucket than the record being stored, the record to be stored is swapped with the current record in the table, then the search continues for an empty bucket in which to store the record displaced from the table.

In order to decide which record must be moved, it is necessary to be able to determine the distance of a record in the table from its ideal bucket. This may either be stored with the record as a "record displacement" field in the bucket, or may be recalculated as needed from the record key.

This algorithm minimizes the variance in search length among records in the table. It also reduces the search length for a failing retrieval search compared to other methods, because if the record displacement of a record being searched for is greater than the record displacement of the current record in the table, the record being sought cannot be in the table. If that record had been stored in the table, it would have displaced a record with a lower displacement.

However, modification of the Robin Hood method is necessary when multiple records can be stored in one bucket, because in this situation we must have a means of deciding which records can be stored in a particular bucket.

Assume that a particular bucket has enough free space to hold the new record that we wish to store, and that the new record is stored in a temporary bucket. Let us refer to the number of buckets by which a record has been displaced as the "record displacement". We may also assume, without loss of generality, that each bucket has a "bucket displacement" field indicating either (a) the record displacement of all records in the bucket, or (b) the highest record displacement of all records in the bucket.

In case (a), if the new record has a lower record displacement than the bucket displacement, the search continues with the next bucket. If the new record has the same record displacement as the bucket displacement, the record is stored in the bucket and the insertion terminates. If the new record has a higher record displacement than indicated by the bucket displacement, the algorithm swaps the entire bucket with the temporary bucket containing the new record and the insertion search continues.

However, this solution may not be desirable because it allows many buckets to contain a lot of unused space just so that all records in a bucket would have the same displacement. It also requires a significant amount of bucket swapping due to mismatches in bucket displacements, which would slow down the insertion process.

In case (b), if the record displacement of the new record is lower than or equal to the bucket displacement, the new record is stored in the bucket and the insertion terminates. Only if the new record has a higher record displacement than the bucket displacement is the bucket swapped with the temporary bucket and the insertion search continued. This reduces swapping as well as increasing storage utilization by increasing the proportion of buckets in which a given record could be stored. A retrieval search may still stop if a bucket with a lower bucket displacement is found than the record displacement of the record being sought. Thus, an exemplary embodiment of the present invention employs strategy (b), in which the bucket displacement indicates the highest record displacement of any record in the bucket.

A record stored in a bucket of a search region may also be of an indirect type, indicating that data are not in the index file and the information stored in the bucket can be used to indicate where the data can be found. That is, an indirect record is a pointer pointing to where the data are stored. There are further different types of indirect record, namely short indirect record and long indirect record. A short indirect record is a record that directs to a location for data that can be stored in one memory block. A long indirect record is a record that directs to a location for data that occupy more than one block of memory or storage space. Through different types of indirect records, indexing to data of a large range of variable lengths can be done efficiently. Details about organizations or structures of different types of records in a bucket will be provided below with reference to FIGS. 5-10B.

Figure 5A:
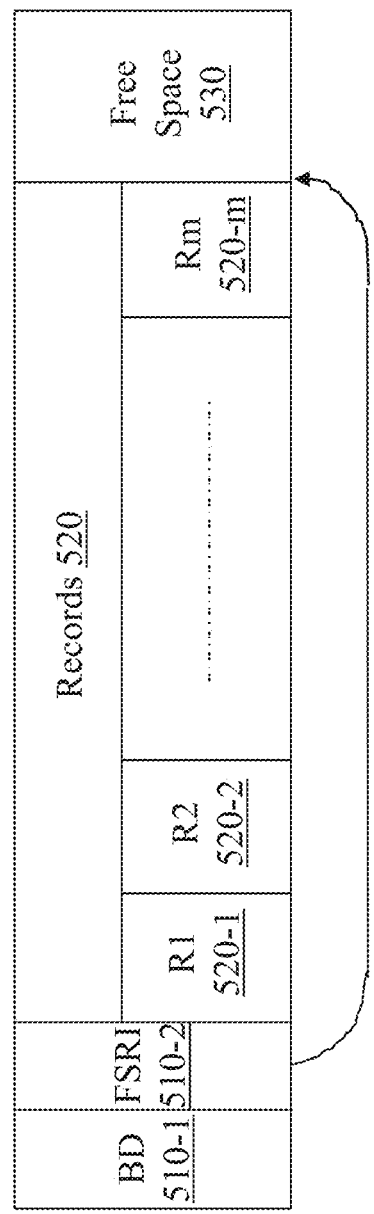
FIG. 5A depicts an exemplary structure of a bucket in a slot of a 2-M hash table, in accordance with an exemplary embodiment of the present teaching.

As discussed herein, a direct record in a bucket in a 2-M hash table is one that stores data directly therein so that an access to the data stored in a direct record can be accomplished directly in the index file 210 without another cache hostile access, thereby reducing the number of such cache hostile accesses to one, compared to the higher number required if using a conventional open hash table relying on pointers for all data accesses. FIG. 5A depicts an exemplary structure of a bucket in a search region of a slot of a 2-M hash table, in accordance with an exemplary embodiment of the present teaching. A bucket with various records starts with a bucket displacement (BD) field 510-1, a free space index (FSRI) field 510-2, and ends with an area in the bucket that represents the free space 530. Between the FSRI and the free space, the bucket may contain one or more records 520 in-between, e.g., first record R1 520-1, second record R2 520-2, . . . , and mth record Rm 520-*m*. The BD 510-1 indicates the highest bucket displacement of any record in the bucket, as discussed herein. The FSRI 510-2 points to the start location in the bucket that is free to use. While either the BD 510-1 or FSRI 510-2, or both, may be used as an optimization to speed up the data access, they are not necessary to practice the present teaching.

A record in a bucket may be a direct record or an indirect record, while an indirect record in turn may be either a short indirect record or a long indirect record. In some embodiments, the lengths of records may vary, depending on the nature of the records. A record for storing direct data may vary in length depending on the lengths of the various components of the record (e.g., a variable-length key and a variable-length value). As long as the data can fit in a bucket, the data can be stored directly in a bucket in the index file 210. The purpose of an indirect record is to re-direct to a location in the overflow file 240 where the actual data are stored; the length for a particular type of indirect record in a bucket may be of a fixed size, as will be discussed below. Each of the records in a bucket illustrated in FIG. 5A may be of a different size, allowing efficient storage of variable-length records in the index file. In each of the records in a bucket, whether direct or indirect, information stored therein is organized in accordance with a certain structure as will be discussed in detail below.

While the disclosed 2-M hash table enables or facilitates variable length data storage with limited cache-hostile accesses, it also enables fixed-length-record storage with a high level of efficiency when the application situation calls for it. The primary benefits of this fixed-length-record storage option are the improvement of storage efficiency and processing speed for 2-M hash table applications where a large proportion of records may be of some fixed-length with records of at least one user-specified key length and value length. It achieves these benefits largely by reducing the amount of overhead space and the amount of record format interpretation required, thereby also minimizing the time overhead needed to store and process these records.

A primary benefit of the 2-M hash table is its ability to contain at least some self-defined records directly in the hash table instead of requiring pointers to separate storage for each such self-defined record. However, this flexibility gained by the use of self-defined records imposes space and time costs that can be avoided in cases where most or all of the records in the hash table are in fact fixed-length records having predetermined key and value lengths. Such space and time costs may be necessary in the general case because a 2-M hash table has to be able to process different lengths and types of records contained in each bucket. For example, a given bucket in a 2-M hash table may contain some direct records with 8-byte keys and 6-byte values, other direct records with 10-byte keys and 8-byte values, and several indirect records referring to keys and values stored in a separate overflow file.

To be able to store or retrieve a record in such a "self-defined-record bucket", the records stored therein must be self-defined. That is, information specific to each record need to be self-contained in the data within the records themselves. For example, a direct record may have a header of one or more bytes specifying the types and the lengths of the key and value fields, while an indirect record may have at least one field indicating that it is an indirect record of a specific type. By contrast, a fixed-length record may not need such overhead bytes when there is a known fixed length for the key and the data, so that the entire record may be devoted to the data content itself. This benefits performance both in space and in time. In terms of space, because the overhead bytes are no longer needed, it may allow more records to be stored in the same bucket and, hence, is more memory efficient. In terms of time, because of eliminating overhead data, it saves the time needed to access and analyze the overhead data to determine the lengths and types of the fields in a self-defined record.

Figure 5B:
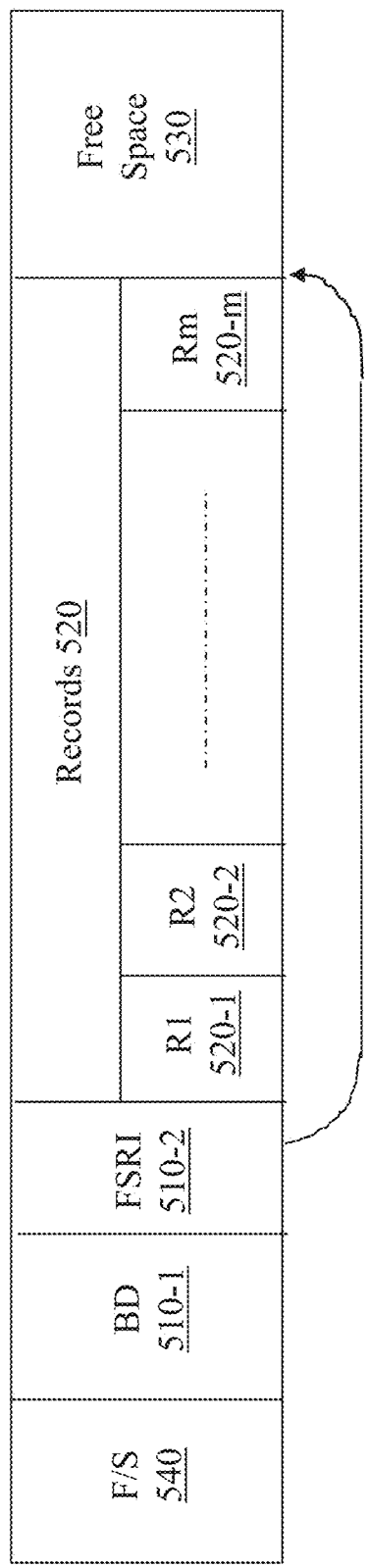
FIG. 5B depicts an exemplary structure of a bucket capable of being designated for either fixed-length-records or self-defined records, in accordance with an exemplary embodiment of the present teaching.

An embodiment of the present teaching discloses a different mechanism that, in a situation where fixed-length-records are applicable, reduces the time and space overhead for storing and processing such fixed-length records in the context of the 2-M hash table as disclosed herein. In some embodiments, the 2-M hash table according to the present teaching enables data storage of both fixed-length and variable length data records. To facilitate the fixed-length-records capability in the 2-M hash table, FIG. 5B depicts an exemplary structure of a bucket capable of being designated for fixed-length-records, in accordance with an exemplary embodiment of the present teaching. This exemplary structure of a bucket capable of being designated for storage of fixed-length-records includes a field "F/S" field 540 for signaling whether the bucket is a fixed-length-record bucket or a self-defined-record bucket. Based on information in this field, it can be determined whether records in this bucket should be processed as fixed-length-records or the self-defined-records.

FIG. 6A depicts an exemplary structure of a direct record in a bucket of a slot in a 2-M hash table for a self-defined-record, in accordance with an exemplary embodiment of the present teaching. As illustrated, a direct record stored in a bucket includes at least 4 fields, including a key length (KL) field 610, a value length (VL) field 620, a key field 630, and a value field 640. Optionally, there is an RT field 605 indicative of a record type according to some embodiments of the present teaching. As illustrated, the value in KL field 610 refers to the length of the key stored in key field 630, while the value of VL field 620 indicates the length of the value field 640. One example of a direct record is provided in FIG. 6B, in accordance with an exemplary embodiment of the present teaching. In this example, the value in RT field 605 is "D", indicating a direct record. The data stored directly in the bucket includes a key ("hnx") in the key field 630 and a value ("q085") in the value field 640 so that the value of KL field 610 is 3, referring to the length of the key stored and the value of VL field 620 is 4, referring to the length of the value stored in the record. As can be seen, using the structure of a direct record, direct data of variable lengths may be stored, retrieved, and managed according to the specified lengths.

If a bucket is designated for fixed-length-records, the structure of data stored therein may be organized to optimize the space and time overhead, as discussed herein. To minimize the overhead necessary to handle fixed-length-records, necessary information, e.g., the key length and the value length for such fixed-length records, may be stored globally. FIG. 6C depicts an exemplary structure of data in a fixed-length-record bucket, in accordance with an exemplary embodiment of the present teaching. As shown in this illustrated embodiment, the data record of a fixed length has two fields, one is a key field 650 and the other is the value field 600 of the data. The length of the key field or FLKL (fixed-length key length) and the length of the value field or FLVL (fixed length value length) are globally maintained (e.g., stored in the 2-M hash table) to reduce memory usage compared to the alternative of storing these parameters in each bucket or slot. Whenever needed, such globally maintained information may be accessed and used when fixed length records are handled. FIG. 6D shows an example of a fixed-length-record with a key of a known length (3 in this example as stored in FLKL) and a data value of a known length (4 in this example as stored in the global variable FLVL). Compared with the same example data record shown in FIGS. 6A and 6B, it is evident that the storage space used for the same data but with the fixed-length storage structure, as shown in FIG. 6C and FIG. 6D, is reduced, and additionally that the decoding of the data type and length needed when processing a variable-length record is accordingly reduced or eliminated, optimizing the processing time for handling this type of record.

In general, embodiments disclosed herein describe fixed-length record optimization in connection with the 2-M hash table. As discussed herein, the fixed-length record optimization for 2-M hash table reduces space and time overheads when a large proportion of records managed via the 2-M hash table correspond to parameters specified for fixed-length record optimization. One skilled in the art will readily understand that various designs may be implemented such that the design is accessible to the programmer and flexible in its capabilities.

The fixed-length record optimization scheme as discussed herein allows a user to specify in the 2-M hash table at least one set of global parameters defining a combination of key length and value length to which a large proportion of the records in a data storage managed via the 2-M hash table is expected to conform. In some embodiments, the fixed-length record optimization for 2-M hash table allows a number of sets of such parameters for fixed-length records to be specified so that data of different fixed lengths may be stored and retrieved from the storage with optimized efficiency.

In some embodiments, whenever a record is presented for storage, the fixed-length record optimization scheme as described herein inspects the record to determine whether its key and value lengths correspond to a set of previously specified fixed-length parameters. In some embodiments, if the key and value lengths of the record do not match a set of previously specified fixed-length parameters, then the record is to be processed as a self-defined record. In some embodiments, if a record's key and value lengths correspond to a set of specified fixed-length parameters for fixed-length-record processing, the fixed-length record optimization process searches for a corresponding fixed-length-record bucket for storing the record.

In some embodiments, any bucket encountered during said search flagged as being used for fixed-length records having fixed-length parameters different from said record may be treated as a full bucket, i.e., such bucket may not be used for storing said record. In some embodiments, when the fixed-length record optimization processing encounters a bucket flagged for self-defined records, such bucket may be treated as a full bucket, i.e., such bucket may not be used for storing said record. In some embodiments, when the fixed-length record optimization processing finds a corresponding fixed-length-record bucket having parameters suitable for the record to be stored and with sufficient space to store said record, the fixed-length record optimization process stores the record with a consecutive key and value with no record header or other space overhead, updating the amount of space used in the bucket accordingly.

In some embodiments, if no bucket is found corresponding to the relevant fixed-length parameters related to the record to be stored, an empty bucket may be initialized to a state suitable to store fixed-length records with those parameters so that the record may be stored in that bucket with the amount of space used in the bucket updated accordingly. In some embodiments, the header for a bucket may include a field of a specified length indicating a set of fixed-length parameters that the bucket is designated for storing. In some embodiments, when the fixed-length record optimization process cannot find an appropriate fixed-length-record bucket to store said fixed-length record, the fixed-length record may be reformatted as a self-defined record, and then passed to the self-defined record process to be stored in a self-defined-record bucket.

In some embodiments, when a key is provided for retrieving its associated value, the fixed-length record optimization process compares the length of the key with the key lengths specified in the global available sets of fixed-length parameters. If the length of the key does not match any of the specified fixed-length key parameters, the record is not stored in a bucket designated for fixed-length records. In this situation, the fixed-length optimization process may pass the key to the self-defined record process for retrieval from a self-defined bucket. If the length of the key matches one or more of the specified fixed-length key parameters, then both the corresponding fixed-length-record buckets and any self-defined-record buckets encountered, may be searched for the record corresponding to the key, because the length of the value corresponding to the key is not known during a retrieval operation and therefore cannot be used as a determining factor in deciding which buckets to search. Accordingly, as each bucket is searched, if it is a relevant fixed-length-record bucket, the fixed-length optimization process searches that bucket for the corresponding record. If it is a self-defined-record bucket, the variable-length record process is invoked to search that bucket for the corresponding record. In some embodiments, regardless of whether the record is found in a fixed-length-record bucket or a self-defined-record bucket, the resulting record (or portion thereof) is returned in the same format as it would have been by the variable-length record process.

Figure 7A:
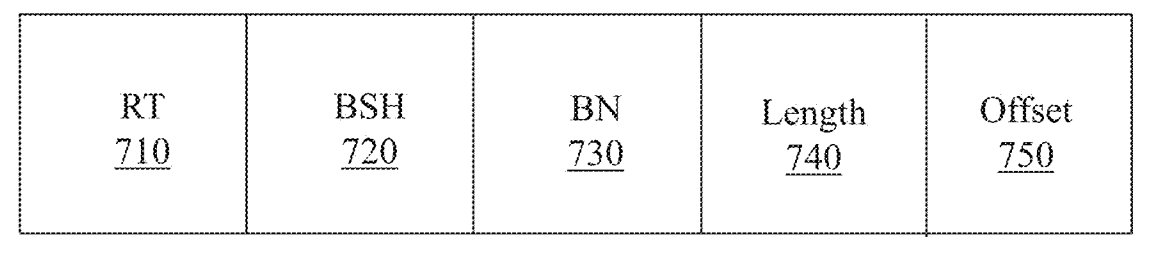

Although different embodiments are described herein as exemplary individual implementations, these embodiments are provided merely as illustration of concepts associated with the present teaching rather than as limitations on the present teaching. These illustrated implementations or embodiments may be modified and/or combined in any way, whether it is as a combination, a super-combination, or a subcombination. A variety of modifications and variations are possible in light of the above teachings without departing from the scope of this invention. Such modifications and/or combinations are still within the scope of the present teaching FIG. 7A depicts an exemplary structure of a short indirect record in a bucket of a slot in a 2-M hash table, in accordance with an exemplary embodiment of the present teaching. As discussed herein, a short indirect record is for directing to a location in the overflow file 240 for data that can be stored in a single physical memory block. Data referred to by a short indirect record may be of any length (so long as it is shorter than one physical block) so that it may be stored in a block with a starting location in the block. As shown in FIG. 7A, a short indirect record may be organized with a plurality of fields provided to direct to a block with the indication of a starting location within the block and the length of the memory or storage used to store the data. In this exemplary structure, a short indirect record includes a record type (RT) field 710, a bucket selector hash (BSH) field 720, a block number (BN) field 730, a length field 740, and an offset field 750. The RT field 710 indicates the record type is short indirect, the BN field 730 provides a block number of the block where the data are stored. The length 740 indicates the length in the block occupied by the data. The offset field 750 points to an offset location within the block where the data start.

The BSH field 720 may be included herein to facilitate more efficient search. Without such a BSH field, each indirect record encountered during a search for a record by key would require an additional cache-hostile access to compare the key being searched for with the key for that indirect record. With the BSH field included in a short indirect record, such a cache-hostile access is needed only if the BSH computed for the key being searched for is the same as the BSH field in the indirect record. For example, with a 32-bit BSH field, the BSH for a key being searched for will match the BSH field for the indirect record on average only once in approximately 4 billion record references, rather than once per record.

Figure 7B:
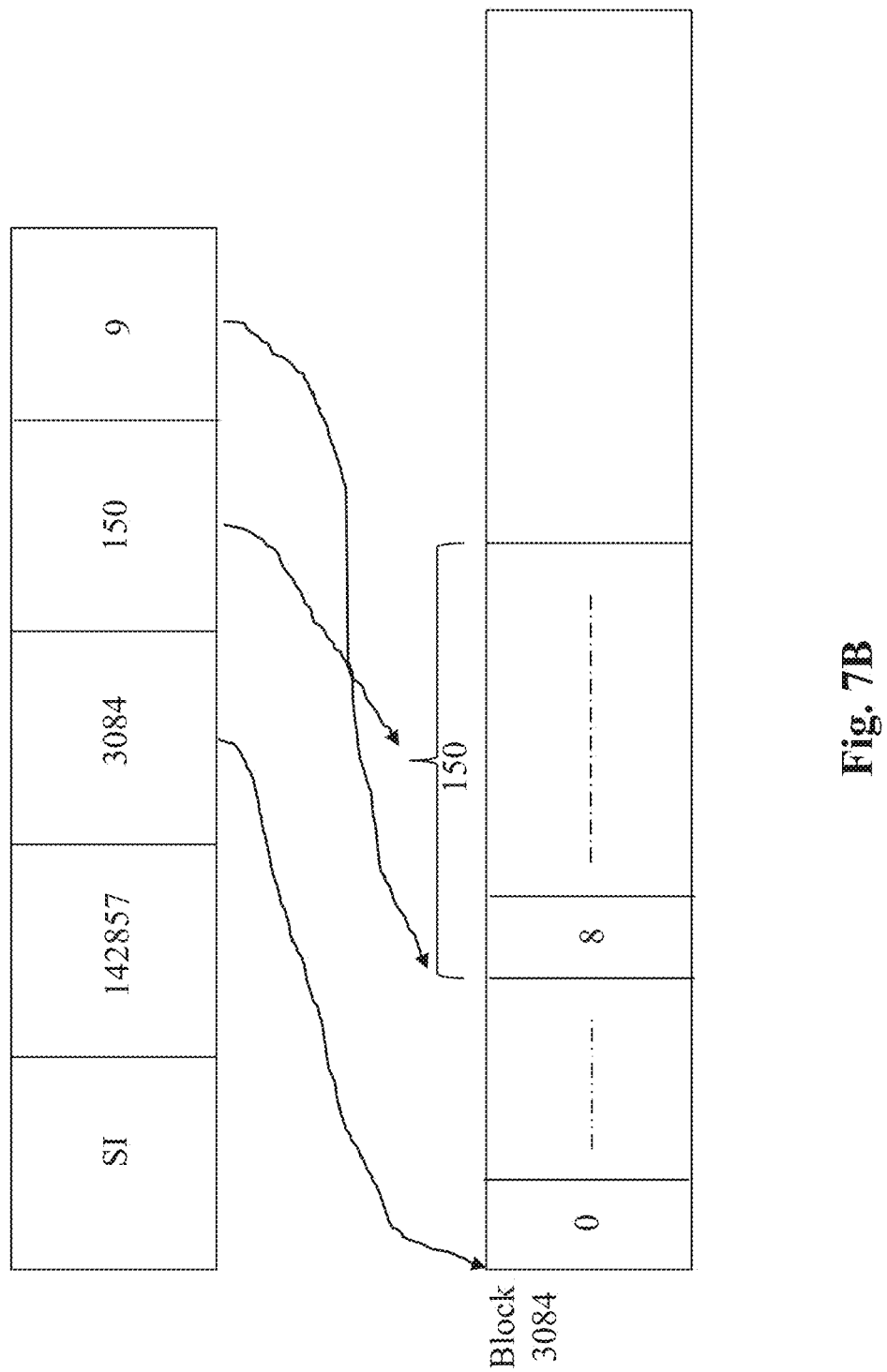
FIG. 7B provides an example short indirect record in a bucket of a slot in a 2-M hash table pointing to a block in an overflow file, in accordance with an exemplary embodiment of the present teaching.

Through the content in such a short indirect record as shown in FIG. 7A, the block and the location therein where data are stored can be identified. FIG. 7B provides an example short indirect record in a bucket of a slot in a 2-M hash table pointing to an overflow block where data are stored, in accordance with an exemplary embodiment of the present teaching. In this example, the RT field 710 has a value "SI" indicating that it is a short indirect record. The value in BN field 730 is 3084, pointing to a physical block with a block number 3084 in the overflow file 240. Value 9 in the offset field 750 indicates a starting location offset from the beginning of block 3084 where the data start, while the value 150 in the length field 740 provides the length in memory the data occupy in the block starting from the offset location. As can be seen, using the information in a short indirect record, the data can be precisely located. In addition, the data so referenced can be of any length so long as it is shorter than one block. Although the exemplary embodiment as illustrated in FIGS. 7A-7B includes five fields (710-750) in a short indirect record, this is merely for illustration and not intended to limit what a short indirect record may include. Additional fields, if needed depending on applications, may also be included.

Figure 8A:
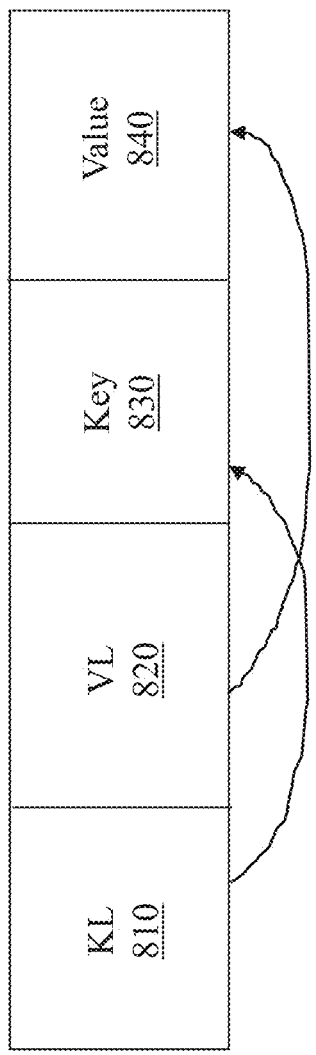
FIG. 8A depicts an exemplary structure of short indirect data in a block of an overflow file in a 2-M hash table, in accordance with an exemplary embodiment of the present teaching.
Figure 8B:
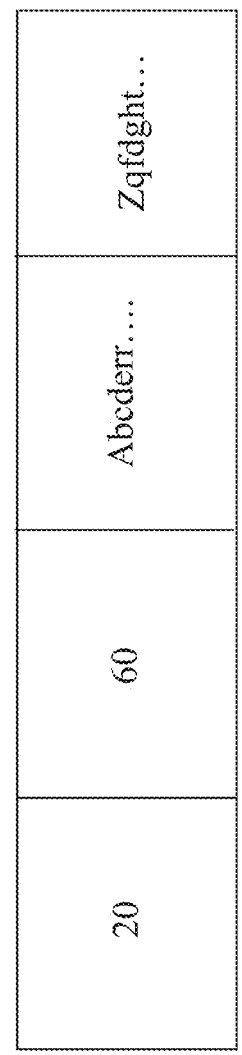
FIG. 8B provides example short indirect data in a block of an overflow file in a 2-M hash table, in accordance with an exemplary embodiment of the present teaching.

The short indirect record as depicted in FIGS. 7A-7B directs from the index file 210 to a specific location in a block in the overflow file 240. Data stored in a block of the overflow file 240 which is pointed to by the short indirect record may include both key and value, which are stored with a certain data structure which needs to be further defined. FIG. 8A depicts an exemplary structure of short indirect data stored in a 2-M hash table, in accordance with an exemplary embodiment of the present teaching. As can be seen, in this illustration, the structure of data stored in a block of the overflow file 240 (referred to by a short indirect record in a bucket of a slot in the index file 210 as shown in FIGS. 7A-7B) is similar to that of direct data (shown in FIG. 6A). In this illustrated embodiment, there are 4 exemplary fields, including key length (KL) field 810, value length (VL) field 820, key field 830, and value field 840. The value in the KL field 810 defines the length of the key stored in key field 830, while the value in the VL field 820 defines the length of the value of data stored in the value field 840. FIG. 8B shows an example short indirect data stored in a block of the overflow file of the 2-M hash table 200, in accordance with an exemplary embodiment of the present teaching. As can be seen that in this way, data of variable lengths can be flexibly stored and referenced precisely via the 2-M hash table 200.

Although the exemplary embodiment or example as presented in FIGS. 8A-8B include four fields (810-840) in the short indirect data, this is merely for illustration and not intended to be limitations to what a short indirect data may include. The presented structure for short indirect data supports and facilitates variable length data storage and retrieval and can include more fields if needed without impacting its ability to enable storage and retrieval of short indirect data of variable length. For example, additional fields may be introduced with a known size for such additional fields. So long as the additional size related to such additional fields is accounted for in the total length 740, as the four fields (810-840) provide the needed information for supporting variable length data, additional fields can be flexibly added.

Figure 9A:
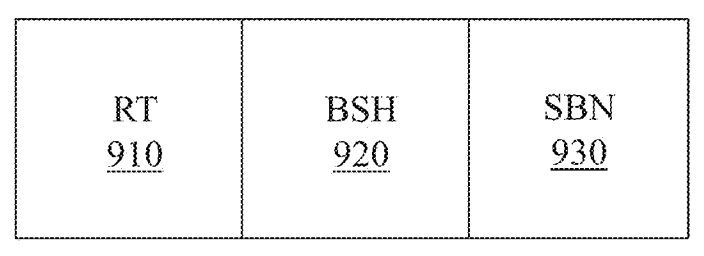

As discussed herein, some data can be stored directly in the index file 210, whereas some data may be stored in the overflow file 240 which can be pointed to by an indirect record stored in a bucket of a slot in the index file 210. For short data that can be stored in a single block, a short indirect record (as shown in FIGS. 7A-7B) can be stored in a bucket in the index file 210 in order to direct access to a block in the overflow file 240. The key and value of the short data may then be further accessed in accordance with the structure as illustrated in FIGS. 8A-8B. As discussed herein, for long indirect data, defined to be data that cannot fit or be stored in a single block, a long indirect record may be stored in the index file for directing to the location in the overflow file 240 where the long data are stored. FIG. 9A depicts an exemplary structure of a long indirect record in a bucket of a slot in a 2-M hash table, in accordance with an exemplary embodiment of the present teaching. As depicted, a long indirect record may include a plurality of fields, including a record type (RT) field 910, a bucket selector hash (BSH) field 920, and a starting block number (SBN) field 930. The RT field 910 in this case has a value that indicates that this record is the long indirect type. The BSH field 920 is provided to facilitate more effective search as explained above. The SBN field 930 provides a block number that points to a block in the overflow file, indicating the start of the region in the overflow file where the long data are stored.

Figure 9B:
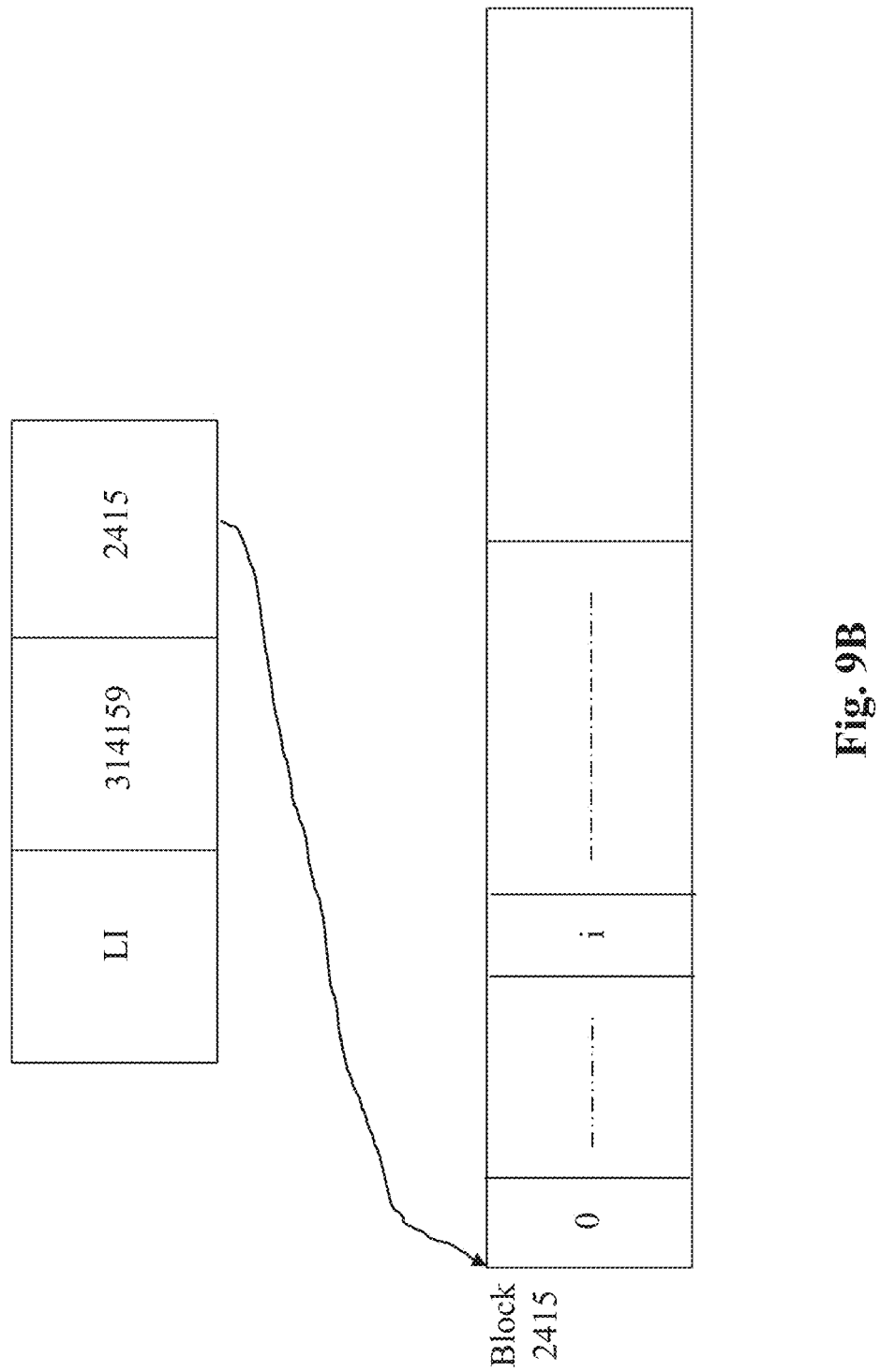
FIG. 9B provides an example long indirect record in a bucket of a slot in a 2-M hash table pointing to a block in an overflow file, in accordance with an exemplary embodiment of the present teaching.

FIG. 9B provides an example long indirect record in a bucket of a slot in a 2-M hash table pointing to a block in an overflow file, in accordance with an exemplary embodiment of the present teaching. As shown in the example, the long indirect record in the index file indicates in the RT field 910 that the record type is long indirect (LI) and with a bucket selector hash code 314159. The block number 2415 is provided in the SBN field 930, which points to block 2415 in the overflow file 240, where the long data at issue start. Similar to the discussion related to a short indirect record, although the exemplary embodiment as illustrated in FIGS. 9A-9B includes three fields (910-930) in a long indirect record, this is merely for illustration and not intended as a limitation to what a long indirect record may include. Additional fields, if needed depending on applications, may also be introduced without an impact to the functionality served by the three fields as disclosed in FIGS. 9A-9B.

Starting from a block in the overflow file 240, pointed to via a long indirect record, the long data (defined to occupy more than a single block) may also be structured in a way that information is to be provided therein to facilitate storage and retrieval. For example, the long data may include a key and a value, each of which may be stored separately with a respective length. FIG. 10A depicts an exemplary structure of long indirect data in the overflow file 240 in the 2-M hash table 200, in accordance with an exemplary embodiment of the present teaching. Similar to that for direct and short indirect data, long data are structured to include a number of fields. In the exemplary embodiment as depicted in FIG. 10A, the long indirect data may include a key length (KL) field 1010, a value length (VL) field 1020, and followed by key 1030 and value 1040, where the value of the KL field 1010 specifies the length of the key 1030 of the long data and the value of the VL field 1020 provides the length of the value 1040 of the long data. FIG. 10B shows an example long indirect data stored in the 2-M hash table 200, in accordance with an exemplary embodiment of the present teaching. In this example, the length of the key is 100 and the length of the value of the long data is 5000. Such access control information is then followed by the actual key "ghqoerr . . . " in length 100 and value "bua,hh . . . " in length 5000, as specified.

Although the exemplary embodiment or example as presented in FIGS. 10A-10B include four fields (1010-1040) in long indirect data, this is merely for illustration, not as a limitation to what a long indirect record or data may include. The presented structure for long indirect data supports and facilitates variable length data storage and retrieval and can include more fields when needed without increasing the number of misses or impacting its ability to enable variable length storage and retrieval of long indirect data. Additional fields may be introduced so long as necessary information is provided in a self-contained manner in the long indirect data to specify different types of data stored therein in terms of, e.g., location and size of each, to facilitate needed storage management.

As discussed herein, a record can be a direct, a short indirect, or a long indirect record, where a direct record has data stored directly in a bucket of the index file and an indirect record (short or long) provides index information pointing to the overflow file 240 where the actual data are stored. Data that can be fit in a bucket may be stored directly in the bucket as a direct record in the index file 210. By storing data directly in the index file 210, it reduces cache-hostile accesses to one as compared with prior art hash tables capable of efficiently storing variable-length data. According to the present teaching, direct data stored in the index file 210 may have different lengths as specified in each direct record (see FIGS. 6A-6B). As also discussed herein, data that cannot fit in a bucket of the index file 210 may be stored in the overflow file 240 and a corresponding index record may then be stored in a bucket of the index file 210 that points to the overflow file location where the corresponding data are stored. Depending on the length of data (whether it can fit in one block), an index record for indirect data may either be a short indirect record or a long indirect record. The structures discussed herein for direct, short indirect, and long indirect records or data all facilitate variable length data storage and retrieval. Thus, through such records as disclosed herein, the number of cache-hostile storage accesses is reduced and variable length data storage can be achieved via the 2-M hash table as described herein.

With respect to hash tables, it is commonly known that they need to be rehashed when certain conditions are met. It is also commonly known that historically when hash tables are rehashed, it frequently causes disruption in data access. Part of the reason for the disruption may be related to the fact that rehashing is not done until further storage operations can no longer be carried out. When that happens, the normal operation in data management has to come to a halt until the hash tables are rehashed. When some condition(s) is/are met, the slots in the index file 210 of the 2-M hash table 200 may be rehashed. In this disclosure, a rehashing scheme according to the present teaching is provided to ensure minimized rehashing disruption to data management operations and to ensure that the maximum number of misses in accessing stored data is limited to two (2). The need for rehashing is monitored in a continuous manner to anticipate the need for rehashing to allow preemptive rehashing performed prior to a situation where disruption may occur.

The criterion or criteria used to assess when a rehashing is needed may be defined based on how soon the space in the index file is going to be filled and/or search time needed to find a space within a search region in a slot that is still available exceeds a particular value, or when the free space in a search region in the slot drops below a certain level. The rehashing scheme according to the present teaching makes it possible for the 2-M hash table 200 to continue to respond to record insertion requests even during the rehashing operation. In general, a rehashed index file is larger in size than the original index file. The increase in size in rehashing may be measured for each slot and applied to all slots with the same increase. The level of increase to slot size may be determined based on application needs. For example, a rehashed slot may be twice as big as its original slot. Other increments are also possible. Such choice of size increase is merely a choice of operational parameters for the inventive rehashing scheme without any limitation on the present teaching.

Figure 11A:
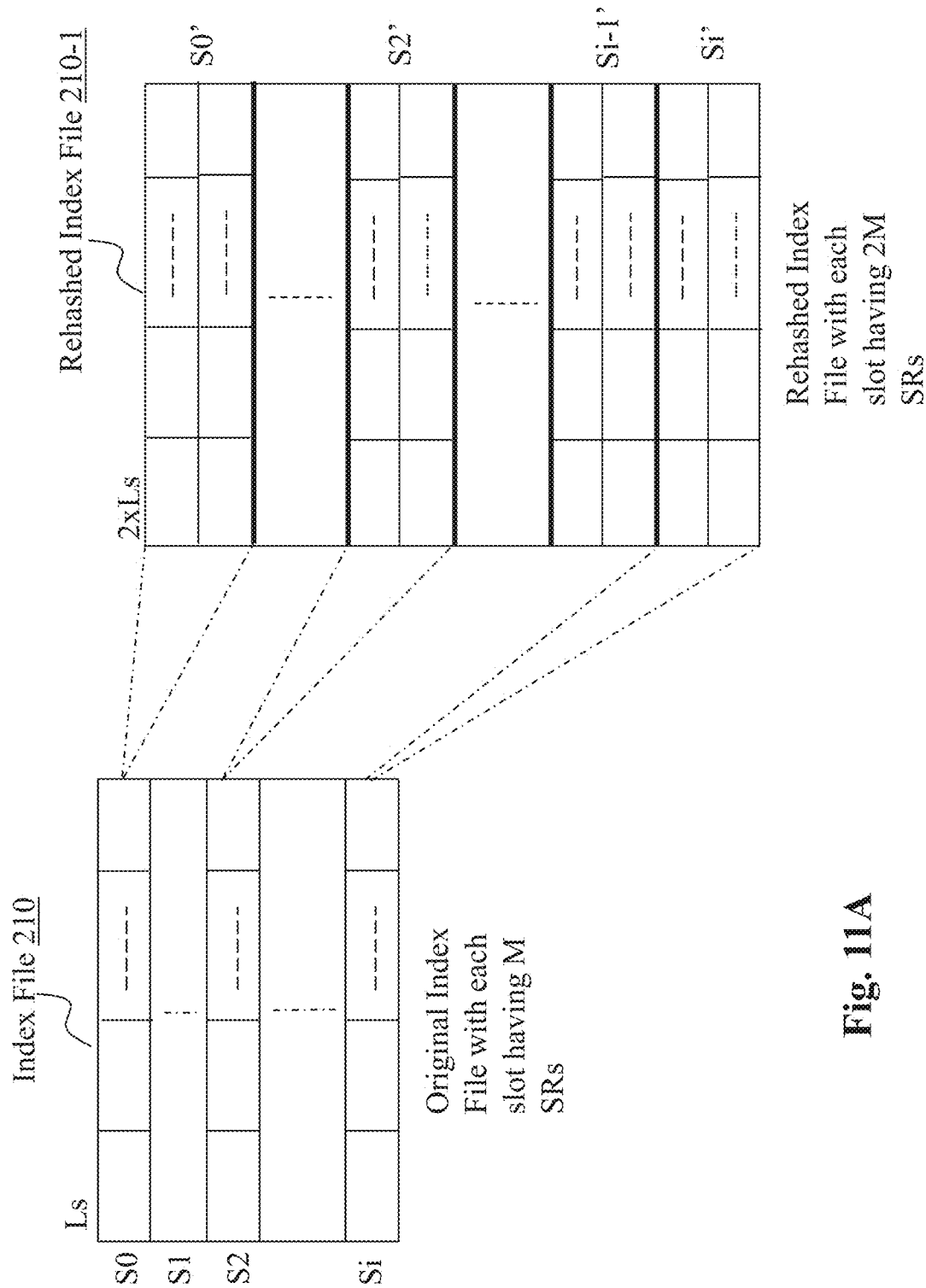
FIG. 11A depicts an exemplary original index file and its rehashed index file in a 2-M hash table, in accordance with an embodiment of the present teaching.

FIG. 11A depicts an exemplary original index file and its rehashed index file in a 2-M hash table, in accordance with an embodiment of the present teaching. In this illustration, on the left, there is the original index file 210 having original slots S0, S1, . . . , Si and each slot has M search regions. As each search region in a slot is of a fixed size, each slot also has a fixed size. On the right is the rehashed index file 210-1 with the same number of slots, correspondingly S0', . . . , S2', . . . , Si-1', and Si', with each rehashed slot of a bigger size, e.g., in this case, twice as big with 2M search regions. The size of a search region does not change from the original index file to the rehashed index file. However, each rehashed slot has doubled the number of search regions. According to the present teaching, rehashing is performed as preemptively as possible and a monitoring mechanism is introduced to detect or anticipate the need for rehashing. To achieve preemptive prediction of the need for rehashing, the present teaching introduces the concept of zones to be applied to each search region in the index file of a 2-M hash table.

Figure 11B:
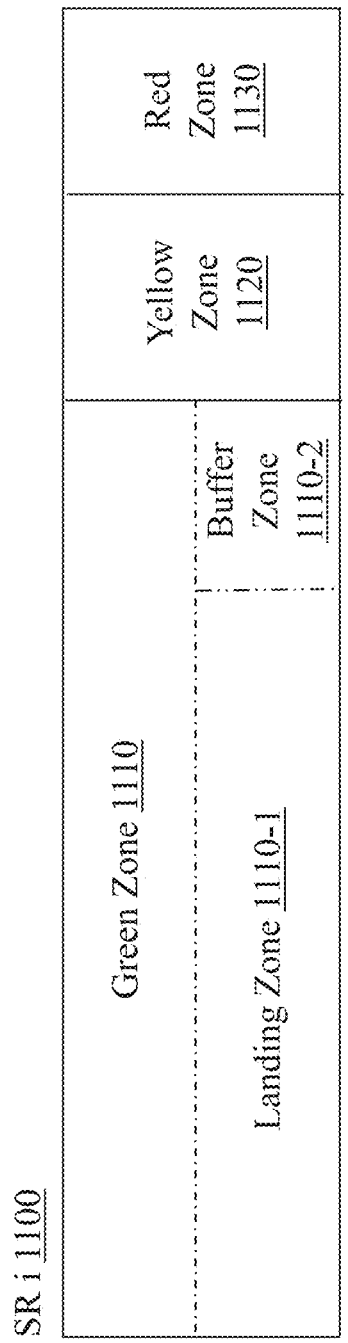
FIG. 11B illustrates an exemplary search region in a 2-M hash table with different zones, in accordance with an exemplary embodiment of the present teaching.

FIG. 11B illustrates an exemplary search region SRi 1100 in a 2-M hash table with different zones, in accordance with an exemplary embodiment of the present teaching. To anticipate the need for rehashing and proactively performing rehashing, multiple zones for a search region such as SRi 1100 may be designated to reflect how fully occupied the search region is at any moment. As illustrated in FIG. 11B, search region SRi 1100 has three zones, including a green zone 1110, a yellow zone 1120, and a red zone 1130. The green zone 1110 represents a safe zone, i.e., if the green zone is not yet used up, there is no need to rehash. The yellow zone 1120 represents that there is not much space left in the search region so that it is the time to perform preemptively rehashing. The red zone 1130 represents that it is the time that rehashing must be performed before storing further data in the search region. As seen, the green zone 1110 is the largest. The specific percentage of space for each zone may be flexible and determined based on application needs or empirical study in each application.

The concept of zoning for each search region is for proactively detecting the level of occupancy of the free space in the search region and accordingly predicting when rehashing needs to be preemptively carried out to avoid a situation in which it is necessary to urgently carry out rehashing by disrupting the data access operation. The yellow zone is provided to serve that goal, i.e., when the green zone has been occupied and data storage starts to get into the yellow zone, it signals the need to preemptively rehash. In some situations, it is possible to enter into the red zone 1130. This can happen if the gradual proactive rehashing activity is not done quickly enough based on the parameters used to monitor the status of the hash table.

In some embodiments, the green zone 1110 may be further divided into a landing zone 1110-1 and a buffer zone 1110-2. The landing zone corresponds to a subset of buckets to which a record can be assigned as that record's ideal bucket. The landing zone is a part of the green zone because when a bucket does not have enough room for a record, the search for a suitable bucket continues toward the end of the search region. This means that if the entire green zone were to be used as the landing zone, as soon as a record reached the last bucket in the landing zone and caused an overflow from that bucket, it would land in the yellow zone, potentially triggering a rehash. If the ideal bucket for a record were near the end of the green zone, this could happen while much of the green zone was still able to accept records. The purpose of the buffer zone is to prevent this from happening, because all records have ideal buckets before the beginning of the buffer zone. Thus, a record can be stored in the yellow zone only when the buffer zone is filled up with records that have spilled over from the landing zone.

According to the present teaching, ideally rehashing is performed preemptively when one or more search regions enter into the yellow zone. In some embodiments, the rehashing condition may be set in such a way that so long as one search region is in yellow zone, the preemptive rehashing is initiated. In some embodiments, the rehashing condition may also be set that if there is a certain percent, e.g., 10%, of the search regions, in the yellow zone, then preemptive rehashing may be initiated. Specific conditions for preemptive rehashing based on yellow zone conditions may be determined based on application needs and are a design choice, rather than a limitation on the present teaching.

Figure 11C:
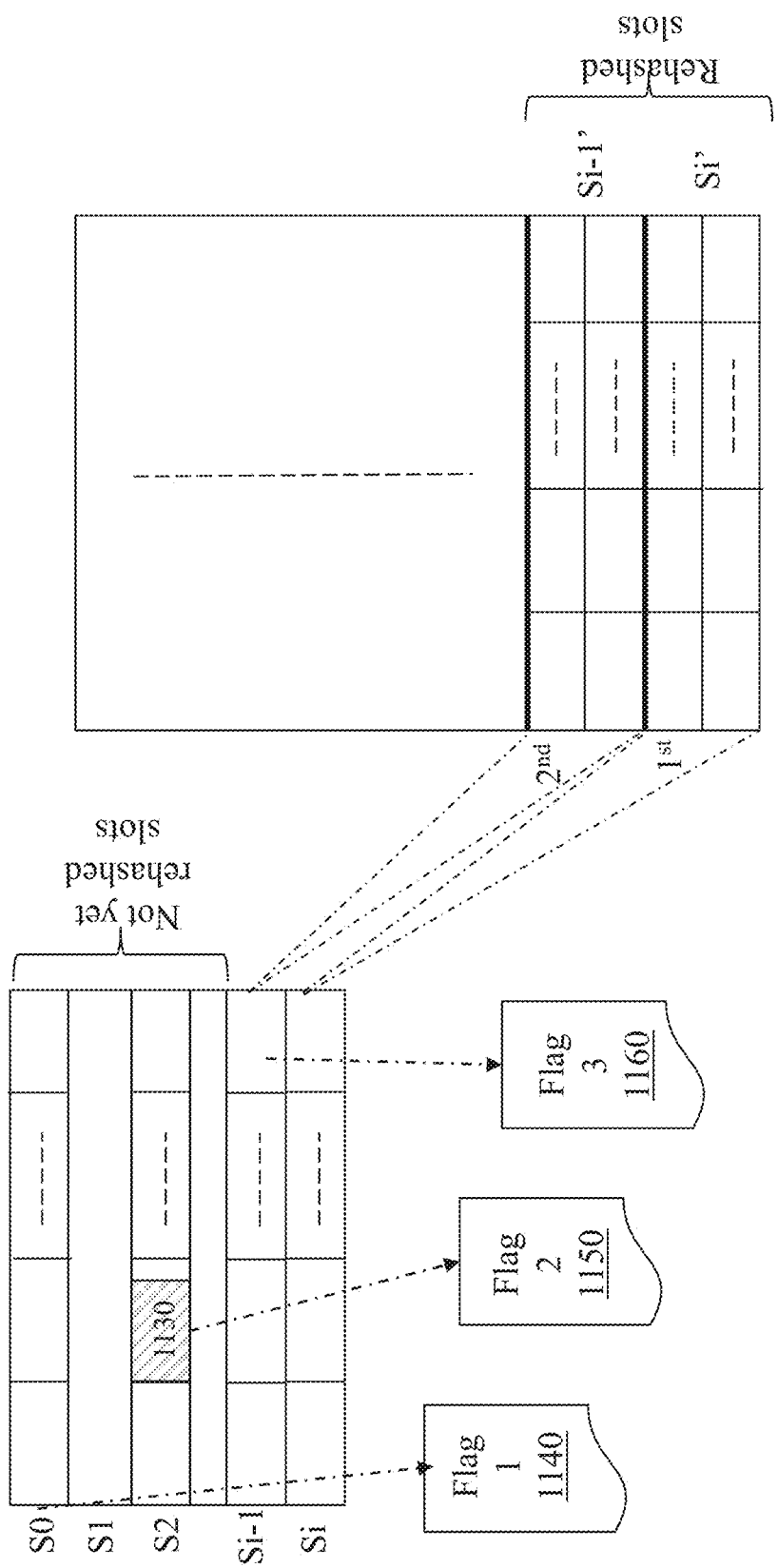
FIG. 11C illustrates an exemplary index file in a rehashing process operated based on different flags, in accordance with an embodiment of the present teaching.

In preemptive rehashing, the process may start with the rehashing of the last original slot and then move up one slot at a time. This is shown in FIG. 11C, which illustrates an exemplary rehashing process controlled based on a number of flags, in accordance with an embodiment of the present teaching. In this illustration, to rely on the zoning concept to proactively monitor the need for rehashing and signal preemptive rehashing operation, the present teaching discloses a number of flags to facilitate both the monitoring and the preemptive rehashing operation, including Flag 1 1140, Flag 2 1150, and Flag 3 1160. According to the present teaching, Flag 1 1140 is provided to record the starting address of the first slot in the original index file (not yet rehashed). Flag 2 1150 is provided to signal the yellow zone condition. In some embodiments, when any of the search regions in the original index file enters into its yellow zone, Flag 2 1150 is raised. In some embodiments, when a pre-determined percent of search regions in the original index file enter their yellow zones, Flag 2 1150 is raised. In either embodiment, the purpose of Flag 2 1150 is to signal that preemptive rehashing is needed.

As discussed herein, the preemptive rehashing, according to the present teaching, is performed by starting with the last slot of the original index file and moving up one slot at a time. As shown in FIG. 11C, when Flag 2 is raised, the first slot to be rehashed is Si (the last slot in the original index file), the second slot to be rehashed is Si-1, etc. As illustrated, the first rehashed slot is Si' with, e.g., doubled size as compared with its original slot Si. Similarly, the second rehashed slot is Si-1' with doubled size as compared with its corresponding original slot Si-1. Flag 3 1160 is provided to record which original slot is most recently rehashed. The value recorded in Flag 3 1160 is used for multiple purposes. The first purpose is for computing the starting address of the rehashed slot when the increment in size of the rehashed slot is known. The second purpose is that it serves to indicate where to retrieve data previously stored. If data to be retrieved reside in an already rehashed slot, then the retrieval operation is performed with respect to a rehashed slot. For example, if data to be retrieved were stored in original slot Si and if Si has already been rehashed (as shown in FIG. 11C), then the data need to be retrieved from the rehashed slot Si'. However, if data to be retrieved were stored in original slot S2, as at this point, slot S2 has not yet been rehashed, the data will need to be retrieved from the original slot S2.

As discussed herein, Flag 1 1140 points to the start address of the first original slot S1. The reason is that the rehashed index file uses the memory space occupied by the original index file plus the increased space to provide the capacity. For instance, if the original index file has 100 slots, each of which occupies 10 blocks of memory, then the original index file takes a total of 1,000 blocks starting from a starting address, say block 000 (to block 999). If during the rehashing, the size of the rehashed index file is to double, each slot will have twice as many search regions (with the search region size remaining the same). In this case, each rehashed slot now takes 20 blocks of memory space and the rehashed index file occupies a total of 2,000 blocks. If the space occupied by the original index file overlaps with the rehashed index file, then the rehashed index file occupies from block 000 to block 1,999. During rehashing, content from an original slot is to be copied to a corresponding rehashed slot of a double size. For instance, taking the example above, when rehashing the last slot Si, the content in the original slot Si is copied from block 990 to block 999 (the space original slot Si occupies) to the double sized rehashed slot Si' now located at blocks 1799-1999. This is the situation when all blocks of the original index file are re-used for the rehashed index file.

In an exemplary embodiment, rehashing is implemented by reading records from an old slot and writing them to the corresponding new slot. With this mechanism, allowing old and new slots to overlap will result in data loss because records will be read from an address region overlapping the address region to which they are written.

Given the above issue, during rehashing, the space occupied by the rehashed index file may avoid the overlap use of the block(s) associated with the first original slot and Flag 1 1140 is used to store the starting address of the rehashed index file. Using this starting address for the rehashed index file, the location of each rehashed slot for the rehashed index file can be computed when the size of each rehashed slot is known.

Figure 11D:
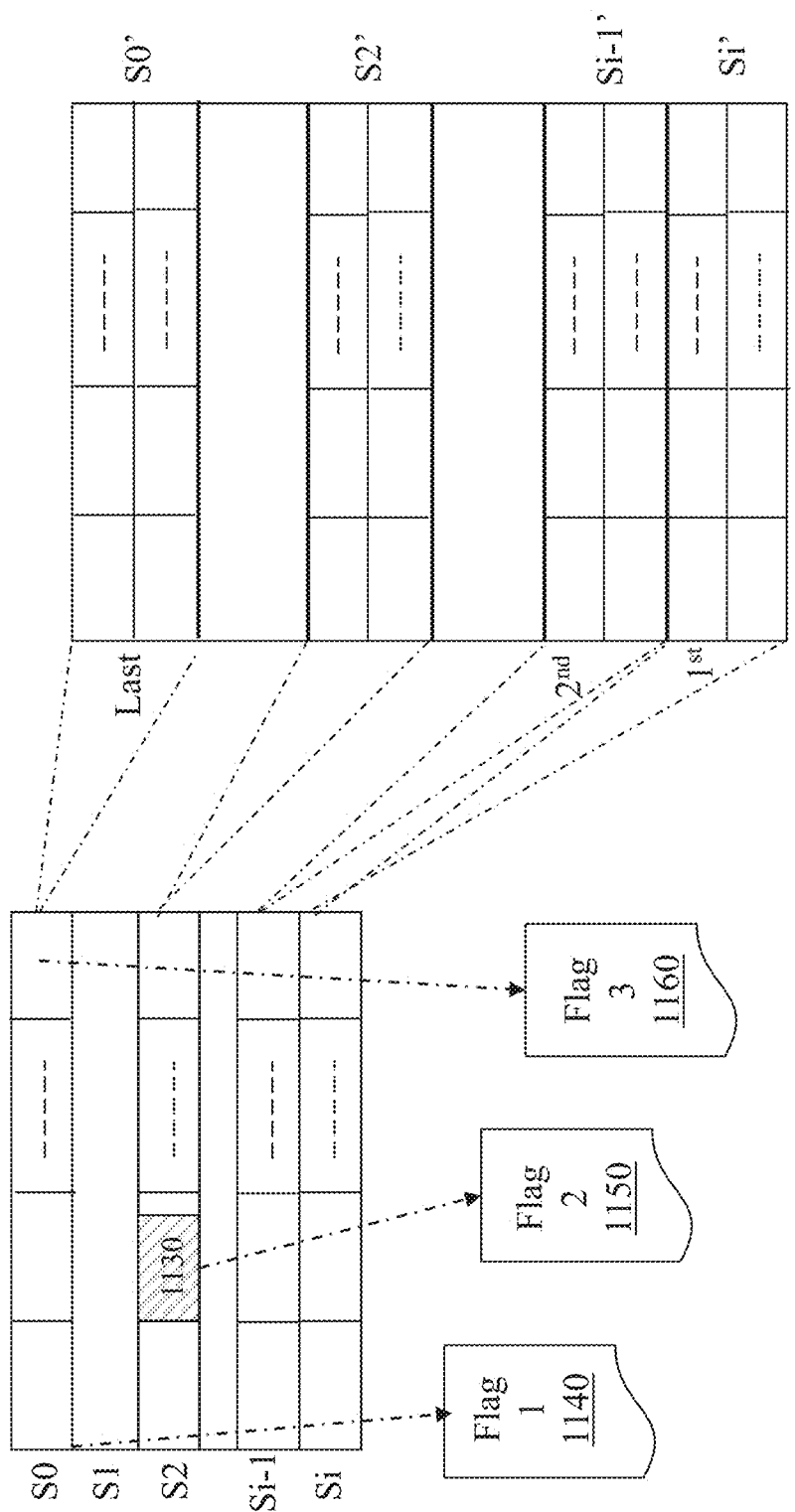
FIG. 11D illustrates an exemplary completely rehashed index file with respect to its original index file, in accordance with an embodiment of the present teaching.

FIG. 11D illustrates an exemplary fully rehashed index file with respect to its original index file, in accordance with an embodiment of the present teaching. As seen in FIG. 11D, the first rehashed slot Si' is for the last original slot Si, the second rehashed slot Si-1' is rehashed from the second last original slot Si-1, . . . , and the last rehashed slot S0' is the first original slot S0. During the middle of rehashing, data access requests can still be handled. If the slot relevant to a data access request has already been rehashed, determined based on the value of Flag 3 1160, then the data request is handled based on the rehashed slot. If the slot relevant to the data request is not yet been rehashed, also determined based on the value of Flag 3 1160, then the data access request is processed based on the content in the original slot. It is possible that during rehashing, more search regions become yellow but that may not interrupt the rehashing operation. If during rehashing, some search region becomes red, data access operations may stop until the entire index file is fully rehashed. In general, the preemptive rehashing mechanism as disclosed herein ensures that most of the rehashing is performed without impacting the data access operation.

As discussed herein, the 2-M hash table 200 having an index file 210 and an overflow file 240, structured and operated in the manner as described herein, leads to reduced cache-hostile accesses, support for variable length data storage and retrieval, and rehash with continued operation without significant disruption to the data management functions. With the 2-M hash table 200, the storage operation is limited to a maximum of 2 misses (cache-hostile accesses). When a hash code is computed, it is used to locate a bucket in search region of a slot the index file 210 so that this corresponds to the first miss. If the record in the bucket stores a direct record, there is no further miss and the operation is accomplished with one miss. If the record in the bucket is an indirect record, this corresponds to the second miss because the content in the indirect record does not contain the actual data but instead contains information redirecting access to the overflow file 240 for the actual data. Whether it is a short indirect or a long indirect record, the short indirect data or the long indirect data can be accessed with a maximum of two misses.

There are additional characteristics associated with the 2-M hash table that enable more efficient storage management operations. For example, because slots in the index file 210 and blocks in the overflow file 240 are all addressed using offset block numbers relative to the starting blocks of the corresponding file of the 2-M hash table, once such starting blocks of the 2-M hash table are known, all other data can be addressed effectively, making the operation more efficient. Furthermore, the records and data in the 2-M hash table 200 can be stored in a format directly usable by an application or program so that no serialization or deserialization operations are needed during startup and shutdown, reducing the time needed for startup and shutdown compared to hash tables that do require serialization and deserialization.

Figure 12:
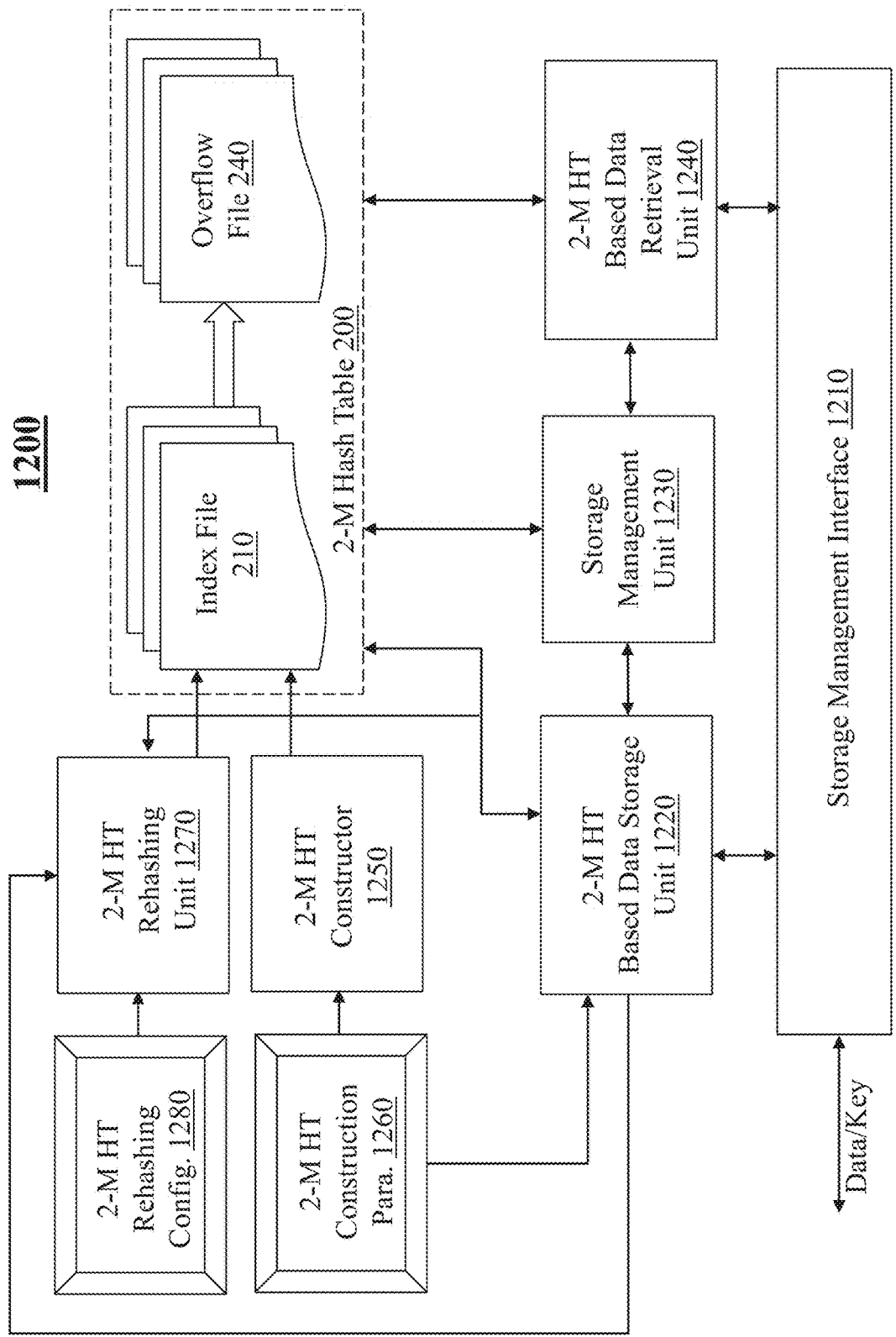
FIG. 12 depicts an exemplary high level system diagram of a storage management system facilitated by a 2-M hash table, in accordance with an exemplary embodiment of the present teaching.

FIG. 12 depicts an exemplary high level system diagram of a storage management system 1200 using the 2-M hash table 200, in accordance with an exemplary embodiment of the present teaching. In this illustrated embodiment, the 2-M hash table 200 includes the index file 210 and the overflow file 240, where indirect records in the index file point to where indirect data are stored in the overflow file 240. The storage management system 1200 comprises two operational parts, including a first part for creating and maintaining the 2-M hash table 200 and a second part for handling data storage requests based on the 2-M hash table 200. The first part comprises a 2-M HT constructor 1250 and a 2-M HT slot rehashing unit 1270. The second part corresponds to the storage management operation and comprises a 2-M HT based data storage unit 1220, a storage management unit 1230, and a 2-M HT based data retrieval unit 1240.

Figure 13A:
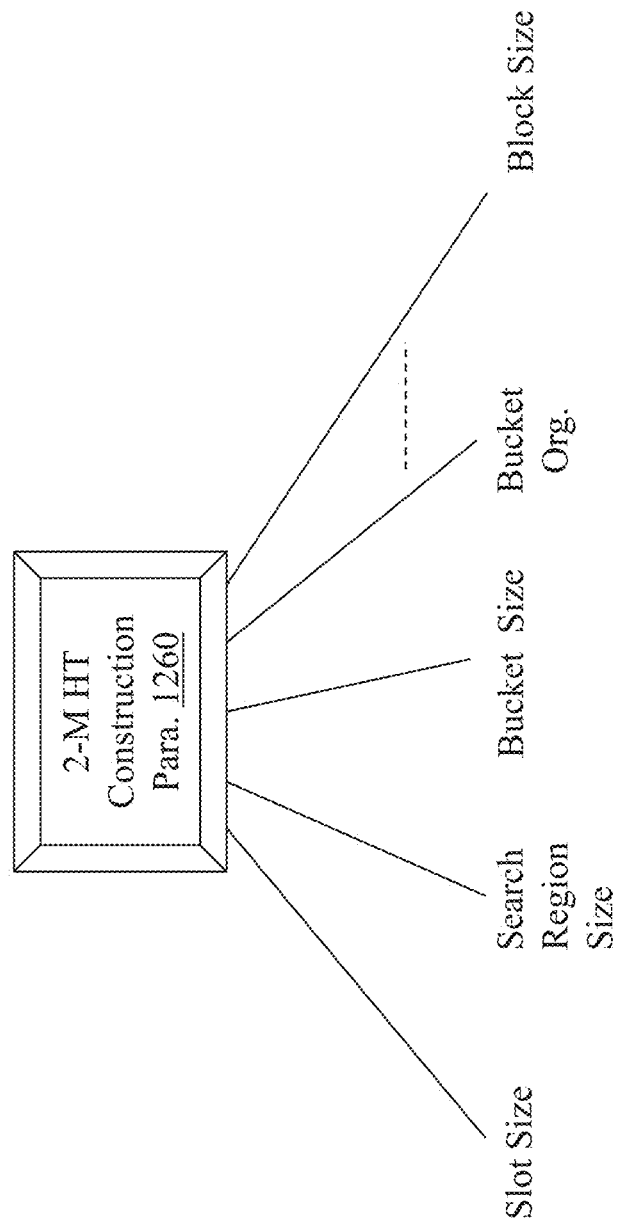
FIG. 13A illustrates exemplary types of parameters used in constructing a 2-M hash table, in accordance with an exemplary embodiment of the present teaching.

The 2-M HT constructor 1250 is provided to create the 2-M hash table 200 in accordance with 2-M HT construction parameters stored in 1260. With this arrangement, the 2-M HT constructor 1250 may be provided in a generic form and it operates to create a 2-M hash table of any characteristics in accordance with the parameters archived in 1260. FIG. 13A illustrates, in accordance with an exemplary embodiment of the present teaching, some exemplary types of parameters used in constructing the 2-M hash table 200. For example, such parameters may include, e.g., a number of slots in the index file 210, a number of blocks each slot occupies, a number of search regions in each slot, a number of buckets in each search region and an organization thereof (not shown), the size of each search region and bucket, internal organization of a bucket, . . . , and block size. Such parameters may be specified based on application needs.

As discussed herein, each slot, once created in the index file 210, may be rehashed when, e.g., certain conditions are met. In the illustrated embodiment of the storage management system 1200 as illustrated in FIG. 12, the rehashing operation may be carried out by the 2-M HT rehashing unit 1270 based on 2-M HT rehashing configuration stored in 1280. Such 2-M HT rehashing configuration may specify various operational parameters needed in order to carrying out rehashing appropriately. For example, the configurations may define conditions under which the index file 210 is to be rehashed, various flags used to record parameters to be used to assess rehashing conditions, operation parameters used to dictate how rehashing is done such as increment to be used in each rehashing, the formulation used to compute the location of each rehashed slot using monitored parameters, whether the memory space occupied by the first slot is to be used, etc.

Figure 13B:
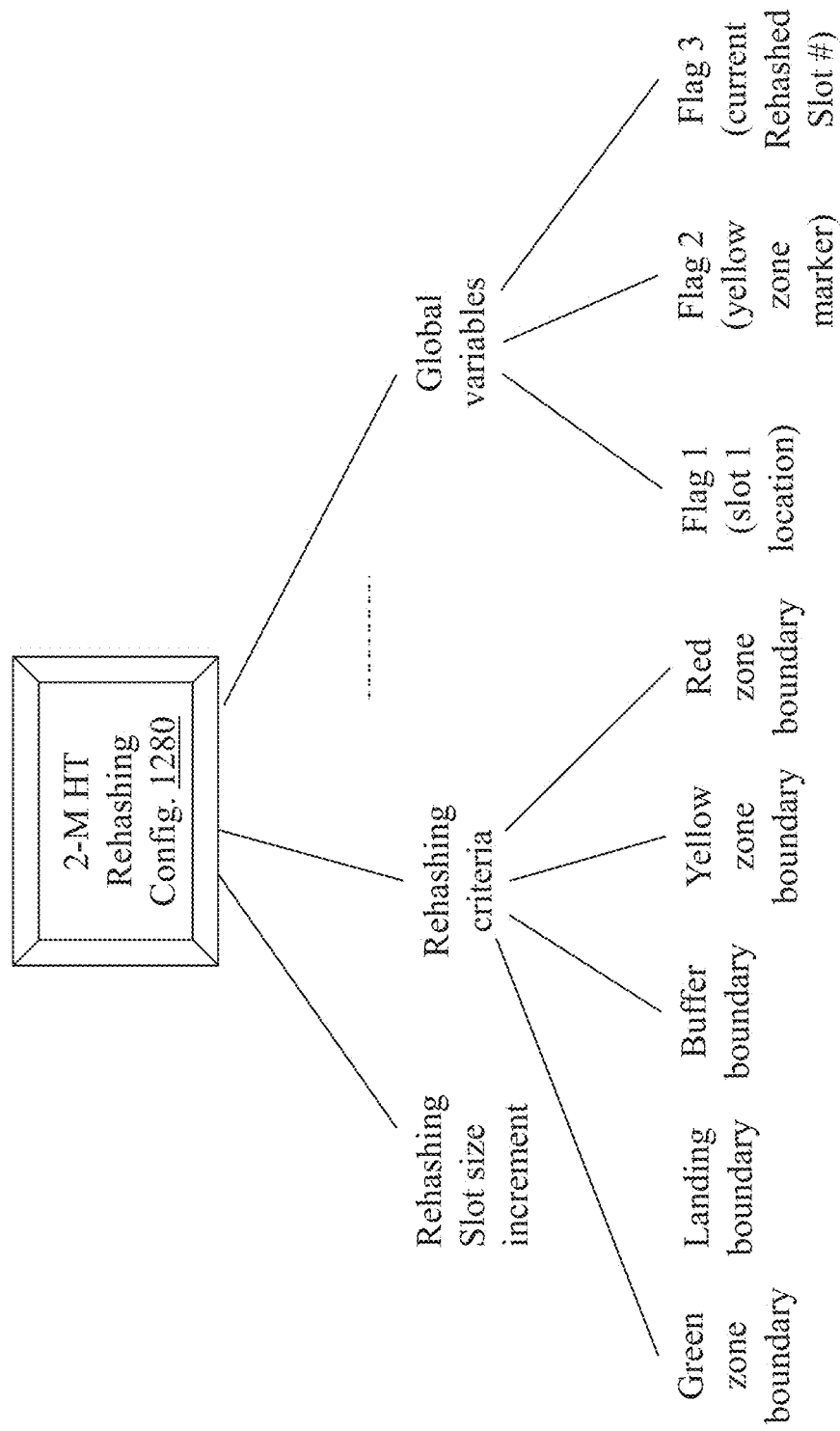
FIG. 13B illustrates exemplary types of configured conditions used in rehashing an index file a 2-M hash table, in accordance with an exemplary embodiment of the present teaching.

This is illustrated in FIG. 13B with exemplary types of configured conditions/parameters related to rehashing of the 2-M hash table 200, in accordance with an exemplary embodiment of the present teaching. As shown, configurations stored in 1280 may define the parameters involved in rehashing such as increment in slot size, the boundary of each of the green, yellow, and red zones in each search region, how a green zone is split into a landing and a buffer zones, and various flags including Flag 1, Flag 2, and Flag 3, etc. There may also be different types of rehashing criteria. In some embodiments, certain heuristics may be specified (not shown in FIG. 13B). In the illustrated embodiment, spatial related criteria and/or temporal related criteria may be provided for controlling when to rehash a slot.

Spatial related criteria may be related to, e.g., a percent of search regions in an index file that is in a yellow zone. As discussed herein, in some embodiments, so long as there is one search region that enters into the yellow zone, rehashing is triggered. In some embodiments, a single yellow zone may not trigger rehashing until the number of search regions having entered yellow zone exceeds a certain percentage. While using yellow zone to proactively anticipate a need for rehashing, it may be combined as well with some kind of temporal related constraint. For example, a temporal criterion may define, within the framework of proactively predicting the need for rehashing, a limit in time needed to search for available space in a search region. When the time needed exceeds a certain level, it may indicate that it may be similarly indicative that rehashing may soon be needed and thus it is warranted to preemptively initiate rehashing. Another similar criterion may be that the search for a suitable bucket to store a record exceeded a certain number of buckets. In some applications, it may also be possible to define a temporal related criterion based on a schedule, i.e., regularly rehashing based on past experience with an interval determined based on, e.g., average time observed for a needed rehashing learned from past operations. Such a learned interval may also be a function of the search region or green zone sizes and the nature of the programs/applications.

In some embodiments, the need for rehashing may be monitored by the 2-M HT slot rehashing unit 1270 based on criteria defined in the configuration 1280. In monitoring against the rehashing criteria, relevant information associated with operation, e.g., which search region enters the yellow zone, may be collected continuously during the storage management operations. Such information may be collected from different units that handle storage access requests, e.g., the 2-M HT based data storage unit 1220.

Figure 14A:
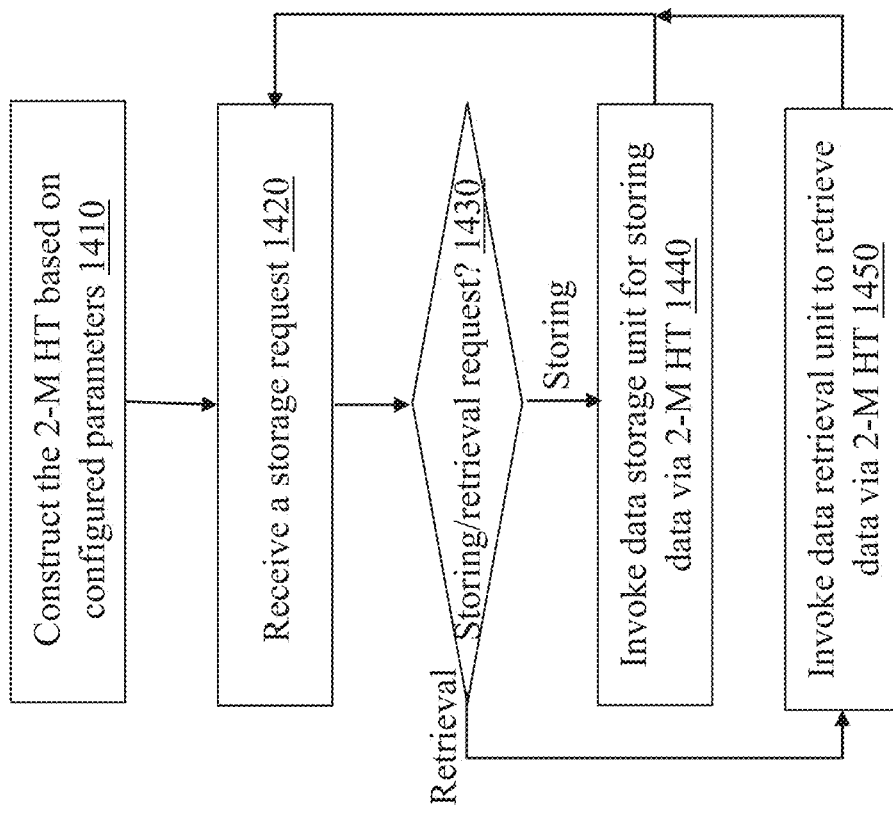
FIG. 14A is a flowchart of an exemplary process of a storage management system operating via a 2-M hash table, in accordance with an exemplary embodiment of the present teaching.

FIG. 14A is a flowchart of an exemplary process of the storage management system 1200 operating based on a 2-M hash table 200, in accordance with an exemplary embodiment of the present teaching. As discussed herein, the operation of the storage management system 1200 has two parts, one is to construct and maintain the 2-M hash table 200 and the other is to handle data storage/access requests based on the 2-M hash table 200. The flowchart as illustrated in FIG. 14A is a high-level process of both parts. The 2-M hash table 200 is initially constructed, at 1410, by the 2-M HT constructor 1250 and the 2-M HT rehashing unit 1270. Details about the construction and rehashing operation are provided with reference to FIGS. 14B, 16, 17A-20B.

Upon the 2-M hash table being constructed, the storage management system 1200 operates to handle data storage/access requests. When it receives, at 1420, a storage request, it determines, at 1430, whether the request is for storing data in or retrieving data from the storage. If the request is for storing new data in the storage, the storage management system 1200 proceeds to step 1440 to invoke the 2-M HT based data storage unit 1220 to carry out what is requested. On the other hand, if the request is for retrieving data stored in the storage, the storage management system 1200 proceeds to step 1450 to invoke the 2-M HT based data retrieval unit 1240 to retrieve the requested data and return the data to the requested user. Details related to data storage and retrieval operation are provided with reference to FIGS. 15A-17B.

Once created initially, the 2-M hash table 200 needs to be maintained to ensure operability of the storage management system 1200. This includes, without limitation, rehashing the index file 210 of the 2-M hash table 200, whenever needed. As discussed herein, the need for rehashing the index file 210 is proactively monitored and the rehashing operation is carried out in general in a preemptive manner. According to the present teaching, there may be different operational modes for rehashing. One corresponds to a synchronous rehashing mode in which rehashing is carried out when handling a data storage request if the yellow or red zone flag is raised. Another mode of operation is asynchronous, i.e., rehashing operation is not synchronized with the data storage operation and is carried out independent of the data request. The flowchart as shown in FIG. 14A corresponds to the synchronous rehashing mode. In handling a data storage request, the yellow zone or red zone is monitored and relevant flags are set dynamically to facilitate the possible rehashing operation. When rehashing is needed, it is carried out when handling a data storage request, i.e., synchronized with the data storage request.

Figure 14B:
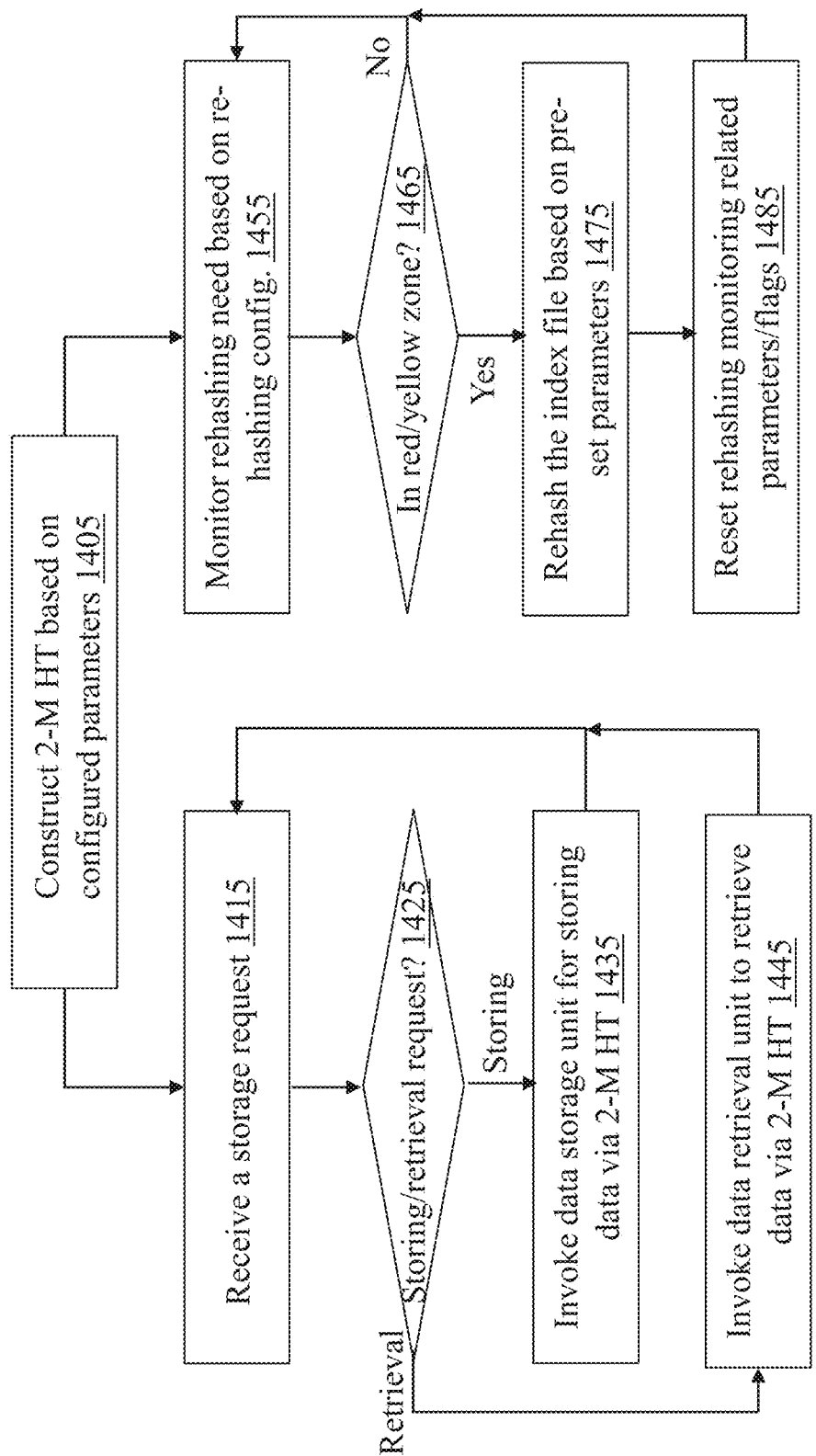
FIG. 14B is a flowchart of an exemplary process of data access with rehashing to be handled in parallel, in accordance with an embodiment of the present teaching.

In an asynchronous mode, a need for rehashing the index file 210 is monitored and carried out independent of the operations related to data management request. That is, the storage management system 1200 may be running with threads of operations, one for handling data management requests and the other for proactively monitoring the need for rehashing and carrying out when it is needed. FIG. 14B is a flowchart of an exemplary process of the data management system 1200 with two parallel threads of operation, in accordance with an embodiment of the present teaching. In this illustrated embodiment, the 2-M hash table 200 is initially constructed, at 1405, by the 2-M HT constructor 1250. Once the initial 2-M hash table 200 is constructed, the operation may be split into two independent threads, one for handling data management requests and the other for proactively monitoring the need for preemptive rehashing and performance thereof when the need is detected.

Along the thread of handling data management requests, the steps are similar to that in FIG. 14A, except that the step of handling a data storage request may not synchronized with rehashing operations. Specifically, when a request is received at 1415, it is determined, at 1425, whether the request is for data storage or data retrieval. If it is for data storage, the operation proceeds to 1435 to invoke the 2-M HT based data storage unit 1220 to handle. If it is a data retrieval request, the operation proceeds to 1445 to invoke the 2-M HT based data retrieval unit 1240 to handle.

The operational steps 1455-1485 are related to the thread for rehashing and may be performed by the 2-M HT rehashing unit 1270, which includes monitoring the use situations of different search regions in the index file, updating flags (e.g., Flag 1, Flag 2, and Flag 3 as discussed herein) accordingly, assessing the timing to perform rehashing, and then carrying out the rehashing. At 1455, the monitoring is performed proactively in accordance with the configuration specified in the 2-M HT rehashing configuration 1280. This may include the condition to raise the yellow or red flags. If the yellow or red flag is raised (e.g., either any one of the search regions in the index file 210 exceeds the green zone or a certain specified percent of the search regions that have entered their respective yellow zones), determined at 1465, the 2-M HT rehashing unit 1270 performs, at 1475, the rehashing to create the rehashed index file based on the rehashing parameters stored in 1280 (e.g., size increment) and additional global variable values (e.g., the values of Flag 1 and Flag 3). Once the rehashed index file is created, the 2-M HT rehashing unit 1270 resets, at 1485, the global variables to facilitate the next round of proactive monitoring for preemptive rehashing operation. Details about the 2-M HT rehashing unit 1270 are provided with reference to FIGS. 19-20B.

Figure 15A:
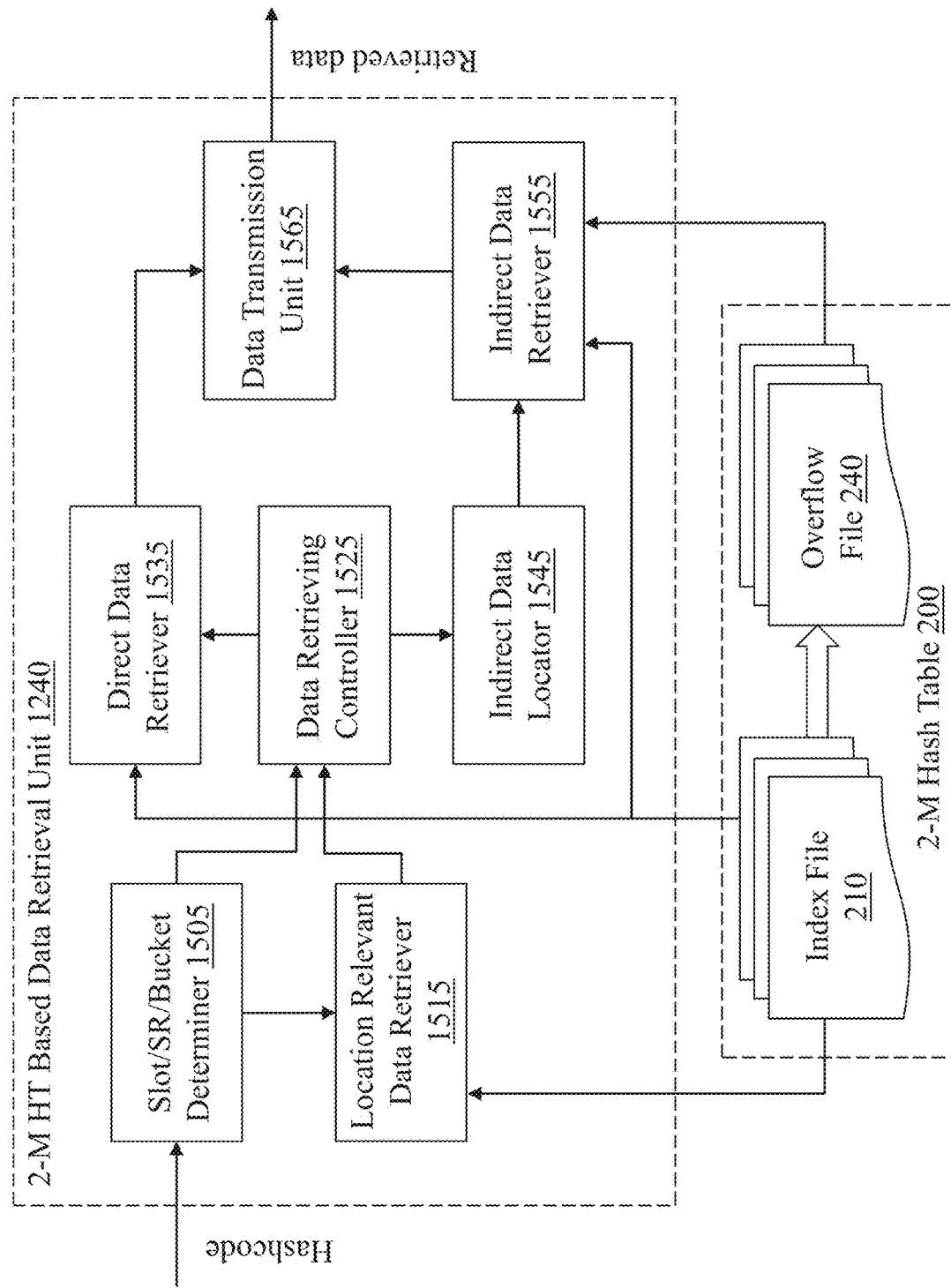
FIG. 15A depicts an exemplary high level system diagram of a 2-M HT based data retrieval unit, in accordance with an exemplary embodiment of the present teaching.

FIG. 15A depicts an exemplary high level system diagram of the 2-M HT based data retrieval unit 1240, in accordance with an exemplary embodiment of the present teaching. As discussed herein, the storage management system 1200 handles data requests in accordance with the 2-M hash table 200, which ensures efficient data management with variable length storage/retrieval with a maximum 2 misses in any situation. As seen in FIG. 15A, the 2-M HT based data retrieval unit 1240 interfaces with the 2-M hash table 200 to facilitate its operation. In this embodiment, the 2-M HT based data retrieval unit 1240 comprises a slot/SR/bucket determiner 1505, a location relevant data retriever 1515, a data retrieving controller 1525, a direct data retriever 1535, an indirect data locator 1545, an indirect data retriever 1555, and a data transmission unit 1565.

Figure 15B:
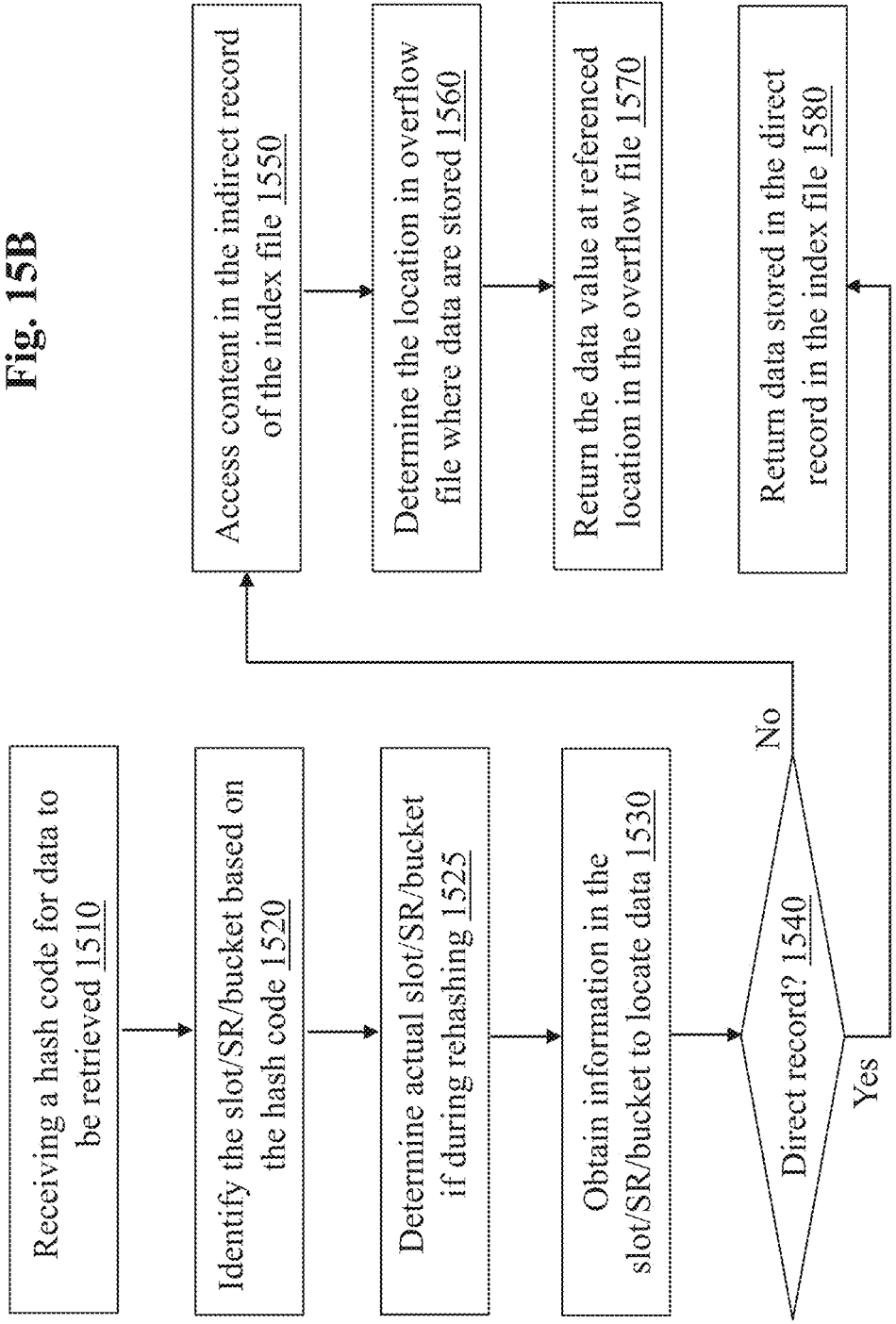
FIG. 15B is a flowchart of an exemplary process of a 2-M HT based data retrieval unit, in accordance with an embodiment of the present teaching.

FIG. 15B is a flowchart of an exemplary process of the 2-M HT based data retrieval unit 1240, in accordance with an embodiment of the present teaching. In operation, when a data retrieval request is received, a hash code is provided as well to facilitate locating where the data are stored. Upon receiving, at 1510, such a hash code corresponding to the data requested, the slot/SR/bucket determiner 1505 identifies, at 1520, a slot number, a search region, and a bucket based on the received hash code. As discussed herein, when a data retrieval request is being processed while the index file 210 is in the process of being rehashed, some of the slots may have already been rehashed and some may have not. In this case, the slot/SR/bucket determined using the hash code may correspond to either an original slot/SR/bucket in the original index file or a rehashed slot/SR/bucket in the rehashed portion of the rehashed index file. The determination may be made with respect to the value of Flag 3, which points to the original slot that is most recently rehashed. If the computed slot/SR/bucket is in a slot that has not yet been rehashed, then the address of the original slot/SR/bucket is the right place to retrieve information. If the slot/SR/bucket computed based on the hash code is in a slot that has been rehashed, then the address of the slot/SR/bucket need to be re-computed based on the value of Flag 1, the rehashing parameters (such as increment of this round of rehashing), etc. This is performed at 1525.

Based on the determined slot/SR/bucket and appropriate address thereof (whether it is according to the original slot or a rehashed slot), the location relevant data retriever 1515 obtains, at 1530, information stored at the identified location and sends it to the data retrieving controller 1525. To determine the location where storing the data requested, the data retrieving controller 1525 analyzes the information stored at the identified location and determines, at 1540, whether the data requested is stored as direct data in the index file 210.

If the data requested are stored in the index file 210 as direct data, the data retrieving controller 1525 invokes the direct data retriever 1535 to return, at 1580, the data stored in the direct record in the index file as the data requested via the data transmission unit 1565. If the data requested correspond to indirect data (stored in the overflow file either as short or long indirect data), the data retrieving controller 1525 triggers the indirect data locator 1545 to access, at 1550, content in the indirect record from the index file 210 and determine, at 1560, a location in the overflow file where the data requested are stored. Such a determination is based on the information coded in the index file and the size of the data requested (long or short) is determined based on information stored in either the index file or in the overflow file. With such determined location and size of the data requested, the indirect data locator 1545 then invokes the indirect data retriever 1555 to retrieve the data requested from the overflow file 240 and then return, at 1570, the retrieved data value(s) to the requesting user via the data transmission unit 1565.

Figure 16:
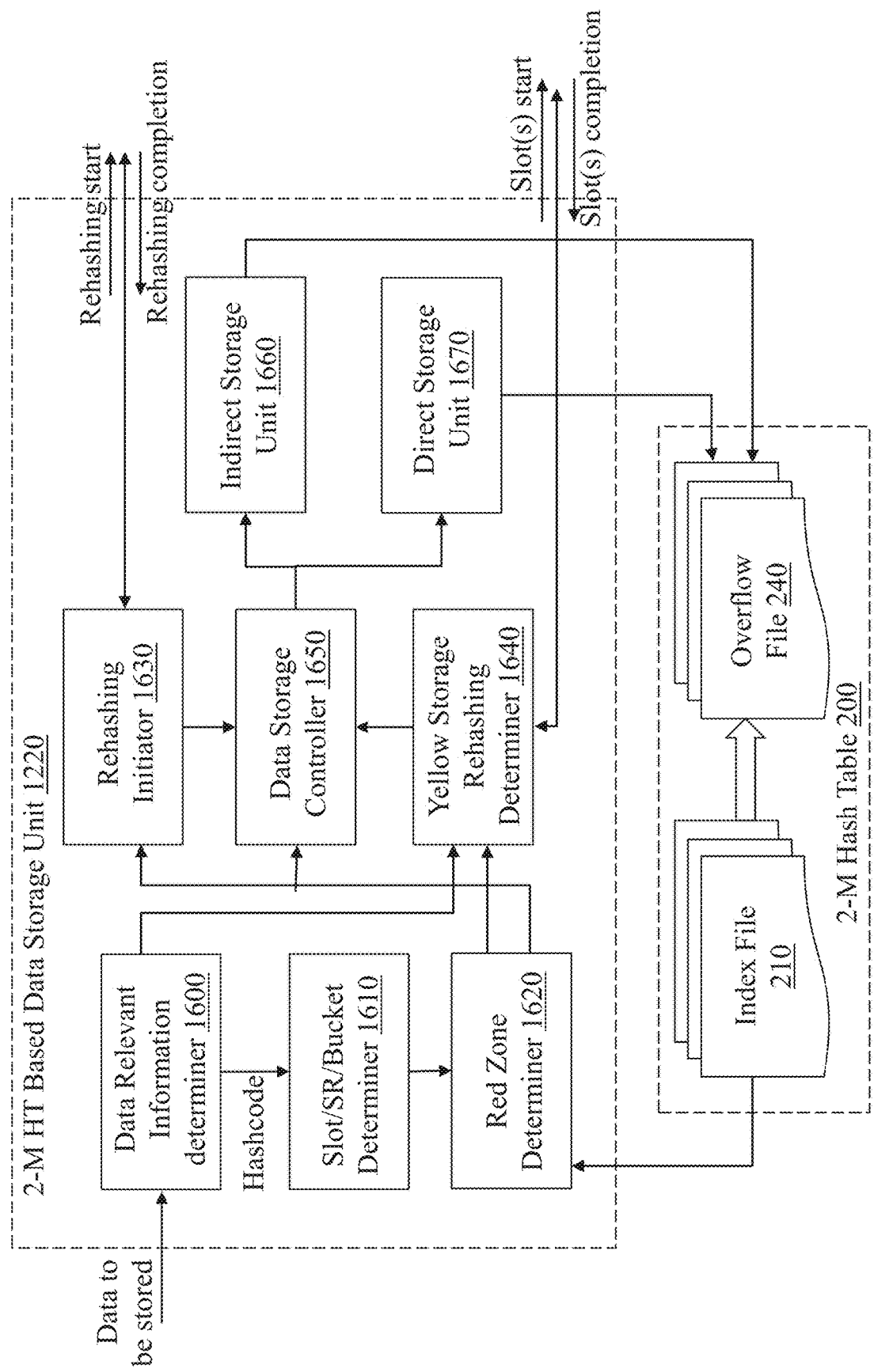
FIG. 16 depicts an exemplary high level system diagram of a 2-M HT based data storage unit, in accordance with an embodiment of the present teaching.
Figure 17A:
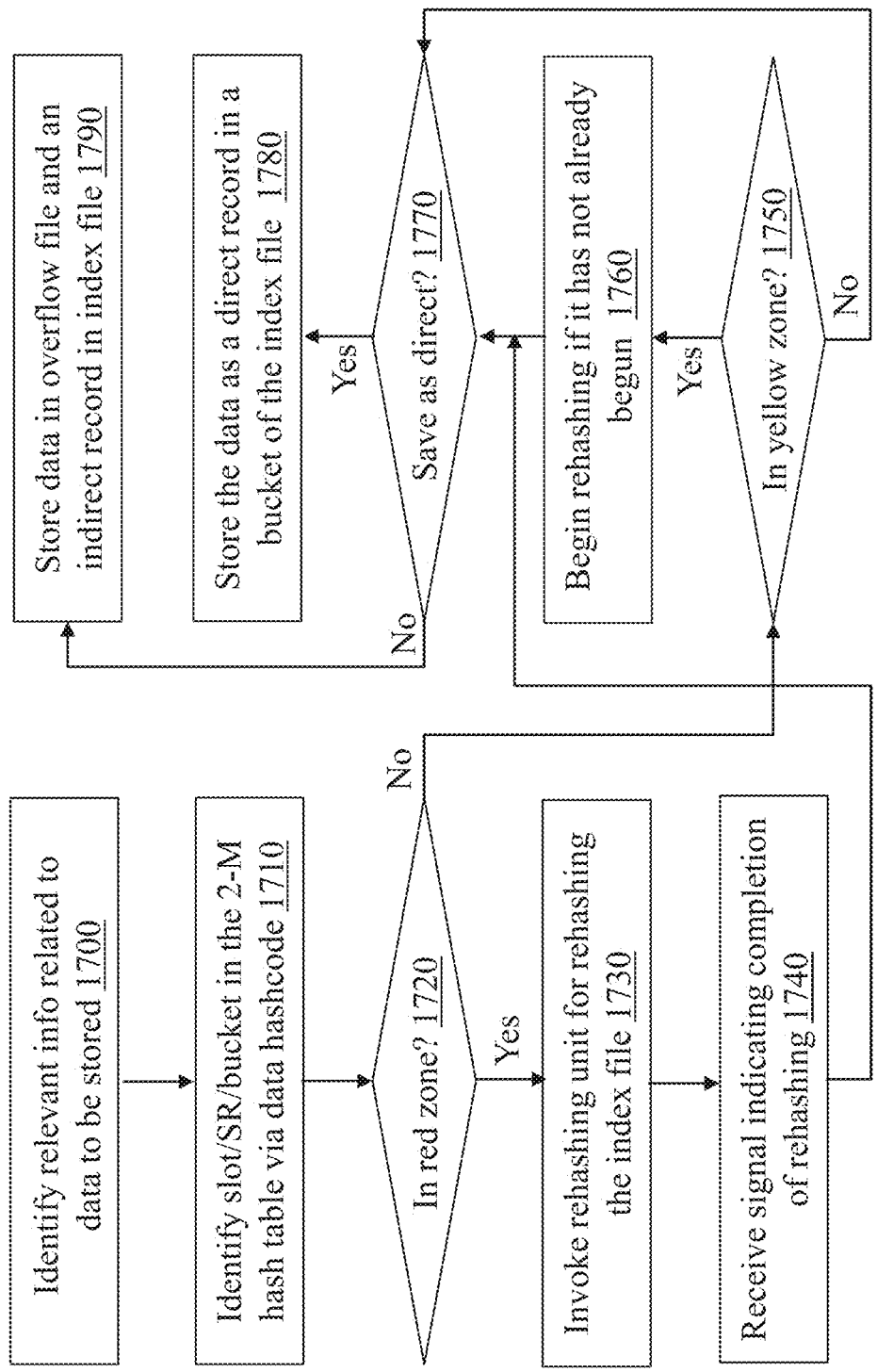
FIG. 17A is a flowchart of an exemplary process of a 2-M HT based data storage unit, in accordance with an embodiment of the present teaching.
Figure 17B:
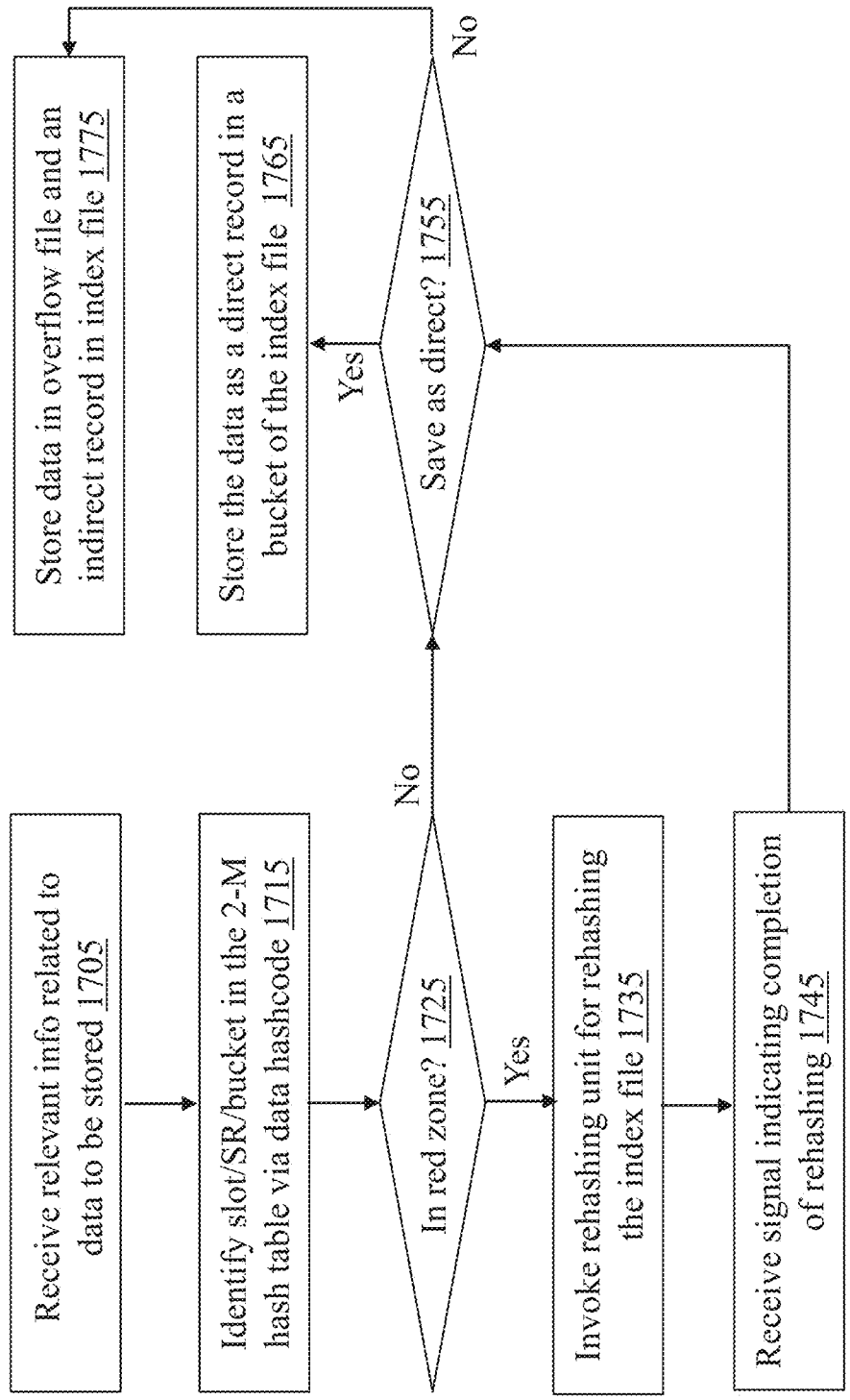
FIG. 17B is a flowchart of a different exemplary process of a 2-M HT based data storage unit, in accordance with an embodiment of the present teaching.

FIG. 16 depicts an exemplary high level system diagram of the 2-M HT based data storage unit 1220, in accordance with an embodiment of the present teaching. Similar to that of the 2-M HT based data retrieval unit 1240, the 2-M HT based data storage unit 1220 operates based on the 2-M hash table 200. In this illustrated embodiment, the 2-M HT based data storage unit 1220 interfaces with the 2-M hash table 200 and comprises a data relevant information determiner 1600, a slot/SR/bucket determiner 1610, a red zone determiner 1620, a yellow storage rehashing determiner 1640, a data storage controller 1650, a rehashing initiator 1630, a direct storage unit 1670, and an indirect storage unit 1660. In operation, these operational units collaborate to consider different possibilities in handling the data storage request, including whether a rehashing operation is to be performed prior to saving the data and/or whether the data to be stored can be save as direct data or indirect data. As discussed herein, there are two different modes of operation when it comes to rehashing in connection with a data storage request. The rehashing may be synchronized with handling a data storage request or may be performed in a separate thread so that it is performed independently. Some of the units included in the 2-M HT based data storage unit 1220 may be provided to handle rehashing in the event that it needs to be done during processing a data storage request. In FIGS. 17A and 17B, two exemplary operation flows are provided that represent the two operational modes with respect to rehashing based on signal associated with the yellow zone Flag 2. When a search region is in a red zone, then the rehashing needs to be carried out before storing the data into the 2-M hash table 200.

FIG. 17A is a flowchart of an exemplary process of the 2-M HT based data storage unit 1220, in accordance with an embodiment of the present teaching. In this exemplary process, the rehashing operation determined based on both red and yellow zone signaling is triggered by or synchronized with the 2-M HT based data storage unit 1220. As such, when data to be stored are received, at 1700 by the data relevant information determiner 1600, it computes a hash code based on the data received (to be stored). Using such computed hash code, slot/SR/bucket for storing the data (or a pointer leading to a location in the overflow file 240 where the data are to be stored) can be identified, at 1710 by the slot/SR/bucket determiner 1610. If such determined search region is in the red zone, determined at 1720 by the red zone determiner 1620, it invokes, at 1730, the rehashing initiator 1630, to rehash the index file 210. Upon receiving the invocation, the rehashing initiator 1630 triggers the 2-M HT rehashing unit 1270 to carry out the rehashing. When the rehashing initiator 1630 receives, at 1740, a rehashing completion signal indicating the completion of a rehashed index file 210, it triggers the data storage controller 1650 to proceed to store the data.

If the search region, identified using the hash code computed based on the data to be stored, is not in the red zone, the yellow storage rehashing determiner 1640 is invoked to determine, at 1750, whether the search region is in the yellow zone. If it is in the yellow zone, the yellow storage rehashing determiner 1640 decides, at 1760, whether to start rehashing if it has not begun and if so, it may invoke the 2-M HT rehashing unit 1270 to begin rehashing the index file.

If immediate rehashing is called for due to encountering a red zone condition, that immediate rehashing is performed. Whether or not that is necessary, the next step is that the data storage controller 1650 determines, at 1770, whether the data to be stored can be saved as direct data in the slot. If the data can be stored as direct data, the data storage controller 1650 invokes the direct storage unit 1670 to store, at 1780, the data as a direct record in a bucket of a search region of the slot. If the data need to be stored as indirect data, either short or long, the data storage controller 1650 invokes the indirect storage unit 1660 to store the received data, at 1790, in the overflow file 240 and then provide appropriate information in a bucket of the search region in the slot. As can be seen, in this exemplary process, the rehashing based on the yellow zone flag is synchronized with the data storage operation.

FIG. 17B is a flowchart of a different exemplary process of the 2-M HT based data storage unit 1220, in accordance with an embodiment of the present teaching. In this illustrated process, the operation of rehashing the index file due to a yellow zone flag is not synchronized with a data storage request. That is, the 2-M HT based data storage unit 1220 handles rehashing only in the event of a red flag, which, if not resolved, does not allow the data to be stored. It does not check proactively whether preemptive rehashing is needed because there is another independent thread dedicated to take care of preemptive rehashing. In this exemplary process, when data to be stored are received, the data relevant information determiner 1600 determines, at 1705, a hash code based on the data to be stored. Such a hash code is sent to the slot/SR/bucket determiner 1610 which identifies, at 1715, corresponding slot, search region, and bucket number based on the hash code. The red zone determiner 1620 then checks, at 1725, whether the search region is in the red zone. If it is in the red zone, the rehashing initiator 1630 is invoked, at 1735, to initiate rehashing. When the rehashing initiator 1630 receives, at 1745, a rehashing completion signal from the 2-M HT rehashing unit 1270, it proceeds to 1755 to start to store data. If the search region is not in the red zone, then the red zone determiner 1620 invokes the data storage controller 1650 to proceed to store the data (without checking yellow zone signal). The data storage controller 1650 determines, at 1755, whether the data to be stored can be saved in the index file as direct data. If it can, the data storage controller 1650 invokes the direct storage unit 1670 to store the data in the search region at 1765. Otherwise, the data storage controller 1650 invokes the indirect storage unit 1660 to save the data in the overflow file, whether it is short or long data, and provide appropriate indexing information in a bucket in the search region of a slot of the index file 210.

Figure 18A:
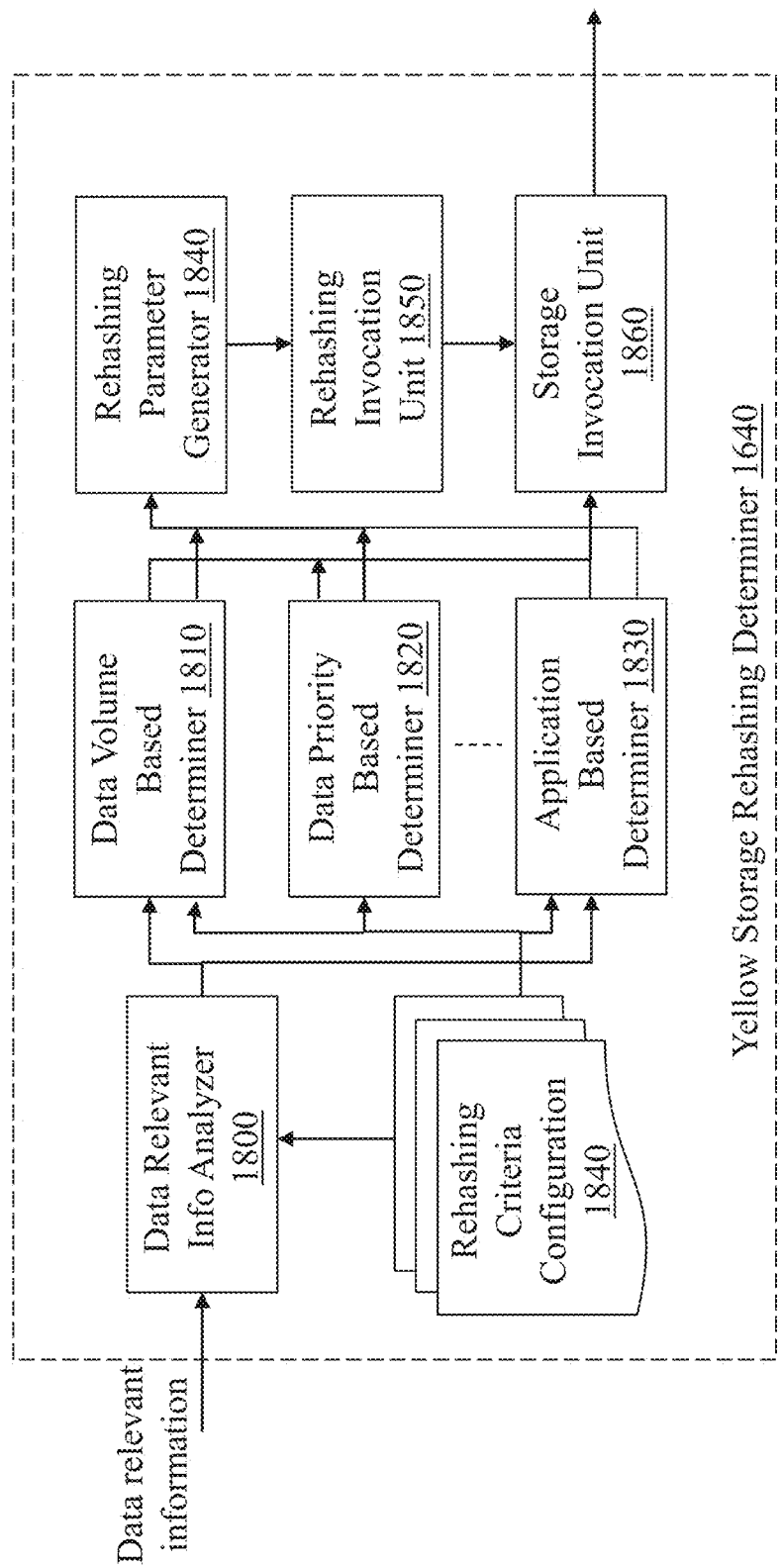
FIG. 18A depicts an exemplary high level system diagram of a yellow storage rehashing determiner, in accordance with an embodiment of the present teaching.

FIG. 18A depicts an exemplary high level system diagram of the yellow storage rehashing determiner 1640 in the 2-M HT based storage unit 1220, in accordance with an embodiment of the present teaching. Th role of the yellow storage rehashing determiner 1640 is to determine, in the embodiment of synchronous rehashing during a data storage request, whether the Flag 2 is raised (indicating either any search region in any slot or a certain set percent of the search regions of the index file 210 has entered into the yellow zone) and if so, whether to perform rehashing. In making this determination, the yellow storage rehashing determiner 1640 may rely on some pre-set or application dependent criterion. For example, the volume of the data to be stored may be used as a criterion. This may be to avoid a red zone situation if storing the data without rehashing may lead to a red zone situation, which may not be desirable. Another exemplary criterion is related to a priority associated with the data to be stored. The storage of certain data may be associated with a high priority and waiting until the rehashing to be done may not be desirable. In general, any criterion defined based on application needs may be specified and considered by the yellow storage rehashing determiner 1640.

In this embodiment illustrated in FIG. 18A, the yellow storage rehashing determiner 1640 comprises a data relevant information analyzer 1800, a number of determiners to assess the need for rehashing, a rehashing parameter generator 1840, a rehashing invocation unit 1850, and a storage invocation unit 1860. The rehashing determiners include, in this illustration, a data volume-based determiner 1810, a data priority-based determiner 1820, . . . , and an application-based determiner 1830, which make rehashing determinations based on the conditions and criteria specified in the rehashing criteria configuration storage 1840.

Figure 18B:
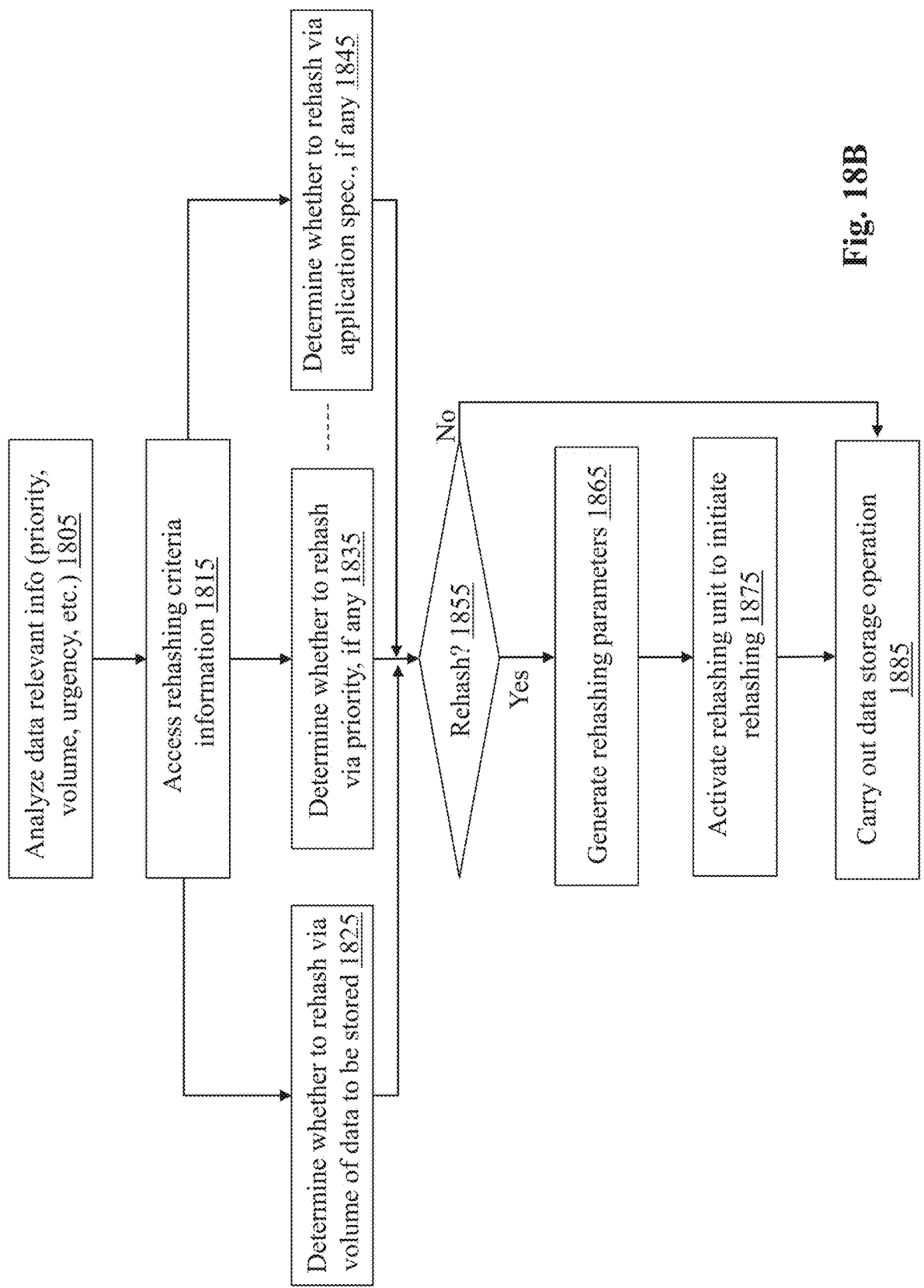
FIG. 18B is a flowchart of an exemplary process of a yellow storage rehashing determiner, in accordance with an embodiment of the present teaching.

FIG. 18B is a flowchart of an exemplary process of the yellow storage rehashing determiner 1640, in accordance with an embodiment of the present teaching. In operation, upon receiving information relevant to the data to be stored, the data relevant information analyzer 1800 analyzes, at 1805, such information to assess, e.g., priority, volume, urgency of the request, etc. and then access, at 1815, the rehashing criteria configuration from 1840 to determine which of the determiner(s) (1810 . . . 1830) to invoke in order to determine whether rehashing needs to be initiated. The invoked determiners then individually determine, at 1825, 1835, . . . , 1845 respectively whether rehashing is to be initiated based on relevant information related to the data and specified conditions. If rehashing is to be performed due to any of the assessments made by the determiners, decided at 1855, the rehashing parameter generator 1840 is invoked to generate, at 1865, rehashing parameters needed to carry out the rehashing operation. With such generated rehashing parameters, the rehashing invocation unit 1850 activates, at 1875, the 2-M HT rehashing unit 1270 to initiate the rehashing. Upon completion of the rehashing or when there is no need to perform rehashing, the storage invocation unit 1860 is activated to carry out data storage at 1885.

Figure 19:
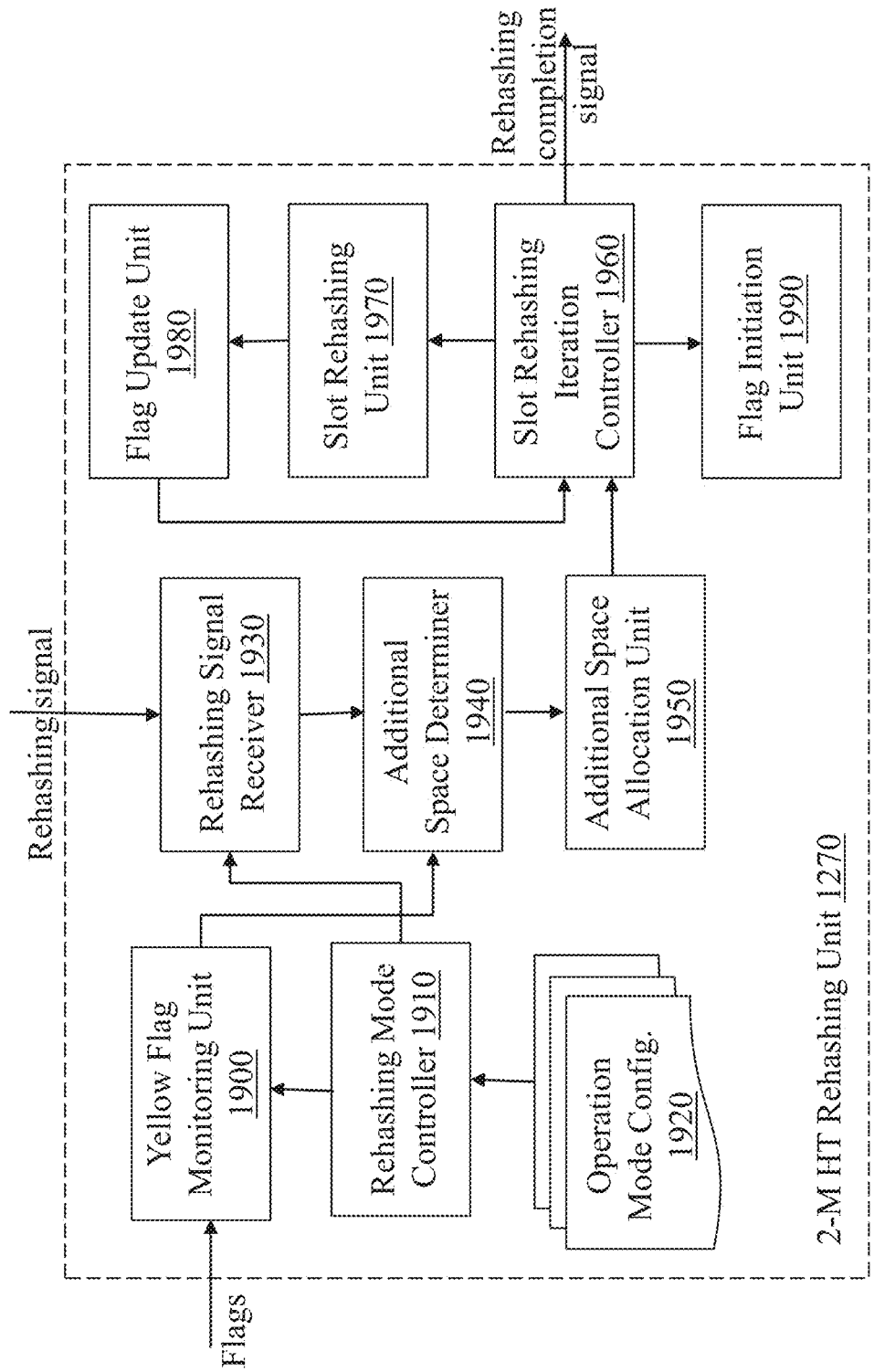
FIG. 19 depicts an exemplary high level system diagram of a 2-M HT rehashing unit, in accordance with an embodiment of the present teaching.

FIG. 19 depicts an exemplary high level system diagram of the 2-M HT rehashing unit 1270, in accordance with an embodiment of the present teaching. As discussed herein, rehashing may be performed in either a synchronous mode while handling a data storage request or in an asynchronous mode where preemptive rehashing is performed regardless of whether there is a data storage request so long as the rehashing condition is met. As such, the 2-M HT rehashing unit 1270 is either being invoked by the 2-M HT based data storage unit 1220 in the synchronous mode or performing rehashing on its own initiative when needed. The exemplary high level system diagram as shown in FIG. 19 is configured to operate in either of the two modes.

The exemplary construction of the 2-M HT rehashing unit 1270 comprises a yellow flag monitoring unit 1900, a rehashing mode controller 1910, a rehashing signal receiver 1930, an additional space determiner 1940, an additional space allocation unit 1950, a slot rehashing iteration controller 1960, a slot rehashing unit 1970, a flag update unit 1980, and a flag initiation unit 1990. The rehashing mode controller 1910 is to control the mode of the rehashing operation according to the operation mode configuration stored in 1920. If it is configured to operate in the synchronous mode, the rehashing mode controller 1910 activates the rehashing signal receiver 1930 to wait for a rehashing signal from the 2-M HT based data storage unit 1220. If it is configured to operate in the asynchronous mode, the rehashing mode controller 1910 activates the yellow flag monitoring unit 1900 to monitor the global flags and to determine when the rehashing condition is met to initiate the rehashing operation. Although the triggering mechanisms under the two modes may differ, once initiated, the rehashing operation remains the same except for the necessity of coordination in the asynchronous mode to avoid storing a record while the slot to which that record is assigned is being rehashed.

Figure 20A:
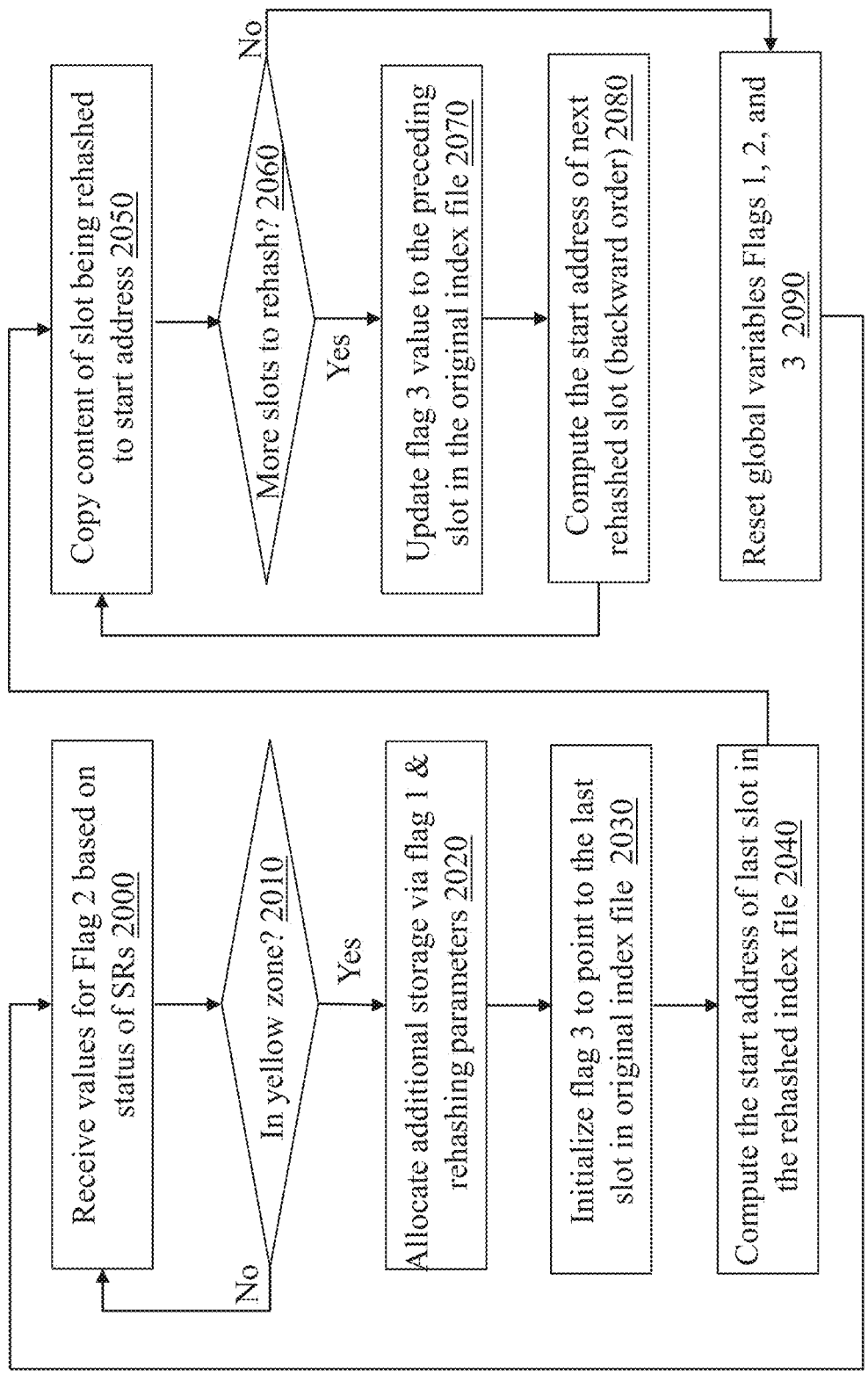
FIG. 20A is a flowchart of an exemplary process for asynchronous rehashing operation of a 2-M HT rehashing unit, in accordance with an embodiment of the present teaching.

FIG. 20A is a flowchart of an exemplary process of the 2-M HT rehashing unit 1270 in the synchronous mode, in accordance with an embodiment of the present teaching. To proactively monitor the rehashing need, the yellow flag monitoring unit 1900 receives, at 2000, values for Flag 2 that is dynamically set based on the status of search regions. If Flag 2 is not raised (e.g., no search region or not enough percent of search regions enters the yellow zone), determined at 2010, the monitoring continues. If Flag 2 is raised, the yellow flag monitoring unit 1900 invokes the additional space determiner 1940 to determine the amount of additional space needed for the rehashed index file based on, as discussed herein, rehashing parameters (e.g., double the number of search regions). Based on such determined additional space needed, the additional space allocation unit 1950 allocates, at 2020, the additional storage in accordance with the value of Flag 1 (which is, e.g., the starting address of the first slot in the original index file) and the rehashing parameters.

Once the space needed for the rehashed index file is allocated, the slot rehashing iteration controller 1960 is invoked to initiate the iterative rehashing process. As discussed herein, the rehashing starts with the last original slot and rehashes it to the last rehashed slot, then the second last original slot is rehashed to the second last rehashed slot, . . . , etc. To do so, the slot rehashing iteration controller

1960 initializes, at 2030, the value of Flag 3 to first point to the last original slot in the original index file and computes, at 2040, the start address of the rehashed slot in the rehashed index file to get ready for rehashing the slot. The slot rehashing unit 1970 is then invoked to carry out the rehashing for the slot by reading or copying, at 2050, the records from of the original slot and storing them in the rehashed slot according to the parameters for the rehashed slot. When rehashing of one slot is completed, it is determined, at 2060, whether there are remaining original slots to be rehashed. If there are, the flag update unit 1980 is invoked to update, at 2070, the value of Flag 3 to point to the location of the next original slot to be rehashed. Then, the next iteration starts by computing, at 2080, the starting address of the corresponding next rehashed slot and reading, at 2050, the records from the next original slot and storing them in the next rehashed slot according to the parameters of that next rehashed slot. When all original slots have all been rehashed, the flag initiation unit 1990 resets, at 2090, the values of global variables such as Flag 1, 2, and 3.

Figure 20B:
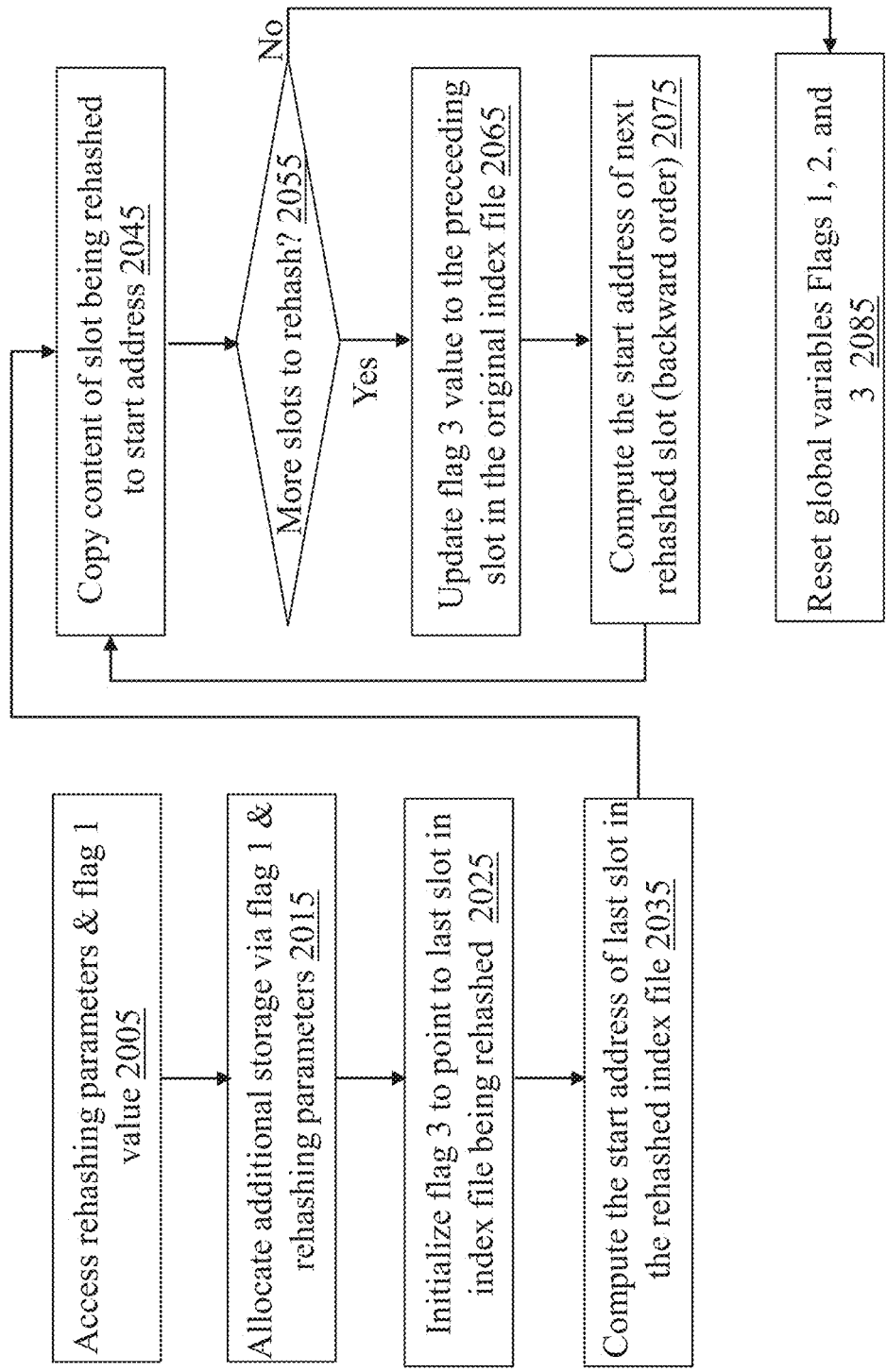
FIG. 20B is a flowchart of an exemplary process of rehashing an index file when invoked, in accordance with an embodiment of the present teaching.

FIG. 20B is a flowchart of an exemplary process of the 2-M HT rehashing unit 1270 in the synchronous mode, in accordance with an embodiment of the present teaching. In this mode of operation, the operation is triggered when the rehashing signal receiver 1930 receives, from the 2-M HT based data storage unit 1220 a rehashing signal. Once triggered, the additional space determiner 1940 accesses, at 2005, rehashing parameters and the value of Flag 1 to determine the additional space needed, which is then used by the additional space allocation unit 1950 to allocate, at 2015, the additional storage needed for the rehashed index file. The remaining steps are similar to that for the asynchronous rehashing.

After the space needed for the rehashed index file is allocated, the slot rehashing iteration controller 1960 is invoked to initiate the iterative rehashing process, by starting with the last original slot and rehash it to the last rehashed slot, then the second last original slot rehashed to the second last rehashed slot, . . . , etc. To do so, the slot rehashing iteration controller 1960 initializes, at 2025, the value of Flag 3 to first points to the last original slot in the original index file and computes, at 2035, the start address of the rehashed slot in the rehashed index file to get ready for rehashing the slot. The slot rehashing unit 1970 is then invoked to carry out the rehashing for the slot by reading or copying, at 2045, the records from the original slot and storing them in the rehashed slot according to the parameters of that rehashed slot. When rehashing of one slot is completed, it is determined, at 2055, whether there are remaining original slots to be rehashed. If there is, the flag update unit 1980 is invoked to update, at 2065, the value of Flag 3 to point to the location of the next original slot to be rehashed. Then, the next iteration starts by computing, at 2075, the start address of the corresponding next rehashed slot and reading, at 2045, the records from the next original slot and storing them in the next rehashed slot according to the parameters of that next rehashed slot. When all original slots have all been rehashed, the flag initiation unit 1990 resets, at 2085, the values of global variables such as Flag 1, 2, and 3. As a response to the rehashing signal, at the completion of the iterated process, the slot rehashing iteration unit 1960 sends a rehashing completion signal to the 2-M HT based data storage unit 1220 so that the data storage process may proceed.

Figure 21:
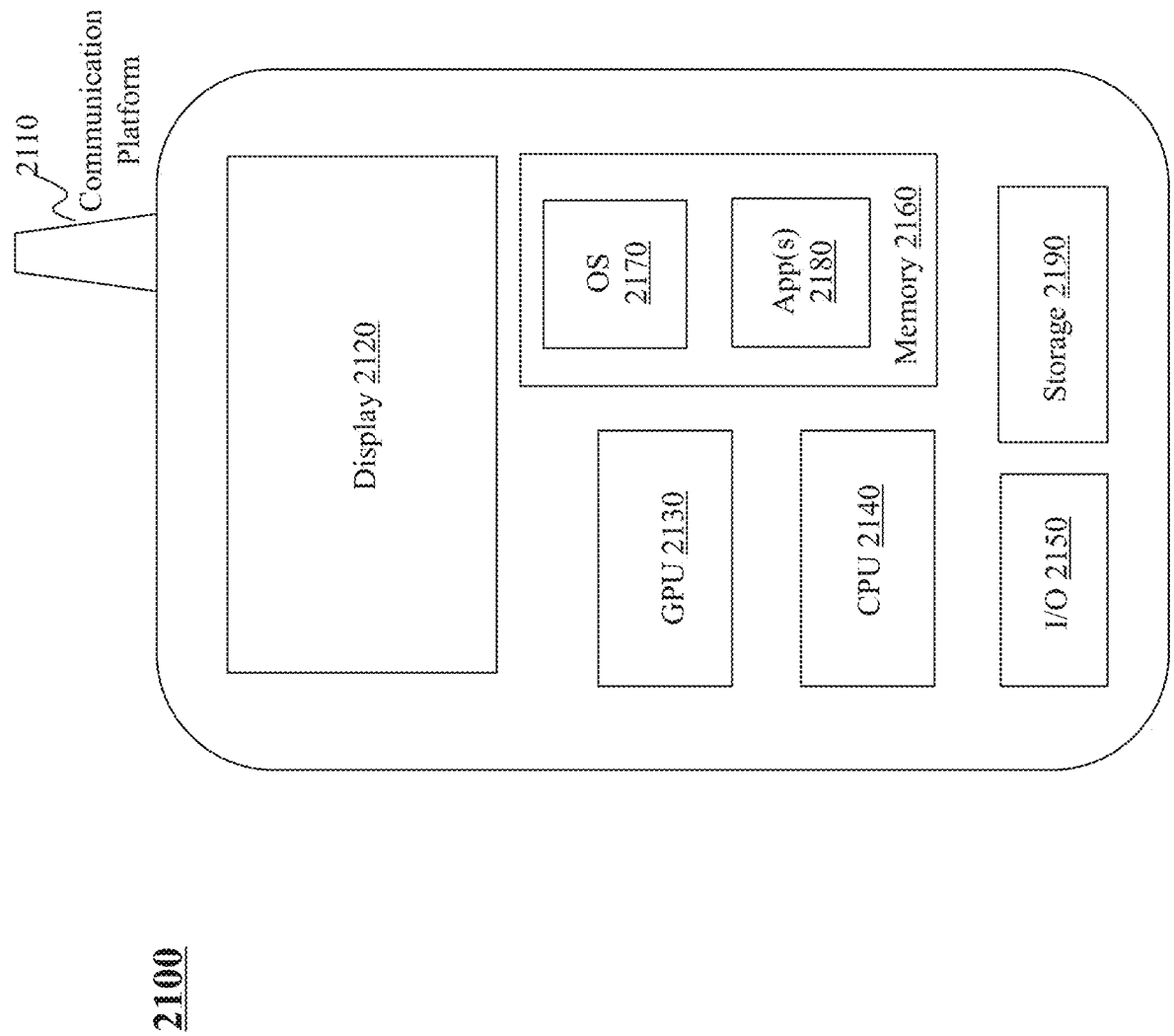
FIG. 21 is an illustrative diagram of an exemplary mobile device architecture that may be used to realize a specialized system implementing the present teaching in accordance with various embodiments.

FIG. 21 is an illustrative diagram of an exemplary mobile device architecture that may be used to realize a specialized system implementing the present teaching in accordance with various embodiments. In this example, the user device on which the present teaching may be implemented corresponds to a mobile device 2100, including, but not limited to, a smart phone, a tablet, a music player, a handled gaming console, a global positioning system (GPS) receiver, and a wearable computing device, or in any other form factor. Mobile device 1800 may include one or more central processing units ("CPUs") 2140, one or more graphic processing units ("GPUs") 2130, a display 2120, a memory 2160, a communication platform 2110, such as a wireless communication module, storage 2190, and one or more input/output (I/O) devices 2150. Any other suitable component, including but not limited to a system bus or a controller (not shown), may also be included in the mobile device 1800. As shown in FIG. 21, a mobile operating system 2170 (e.g., iOS, Android, Windows Phone, etc.), and one or more applications 2180 may be loaded into memory 2160 from storage 2190 in order to be executed by the CPU 2140. The applications 2180 may include a browser or any other suitable mobile apps for information management according to the present teaching on mobile device 2100. User interactions, if any, may be achieved via the I/O devices 2150 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 22:
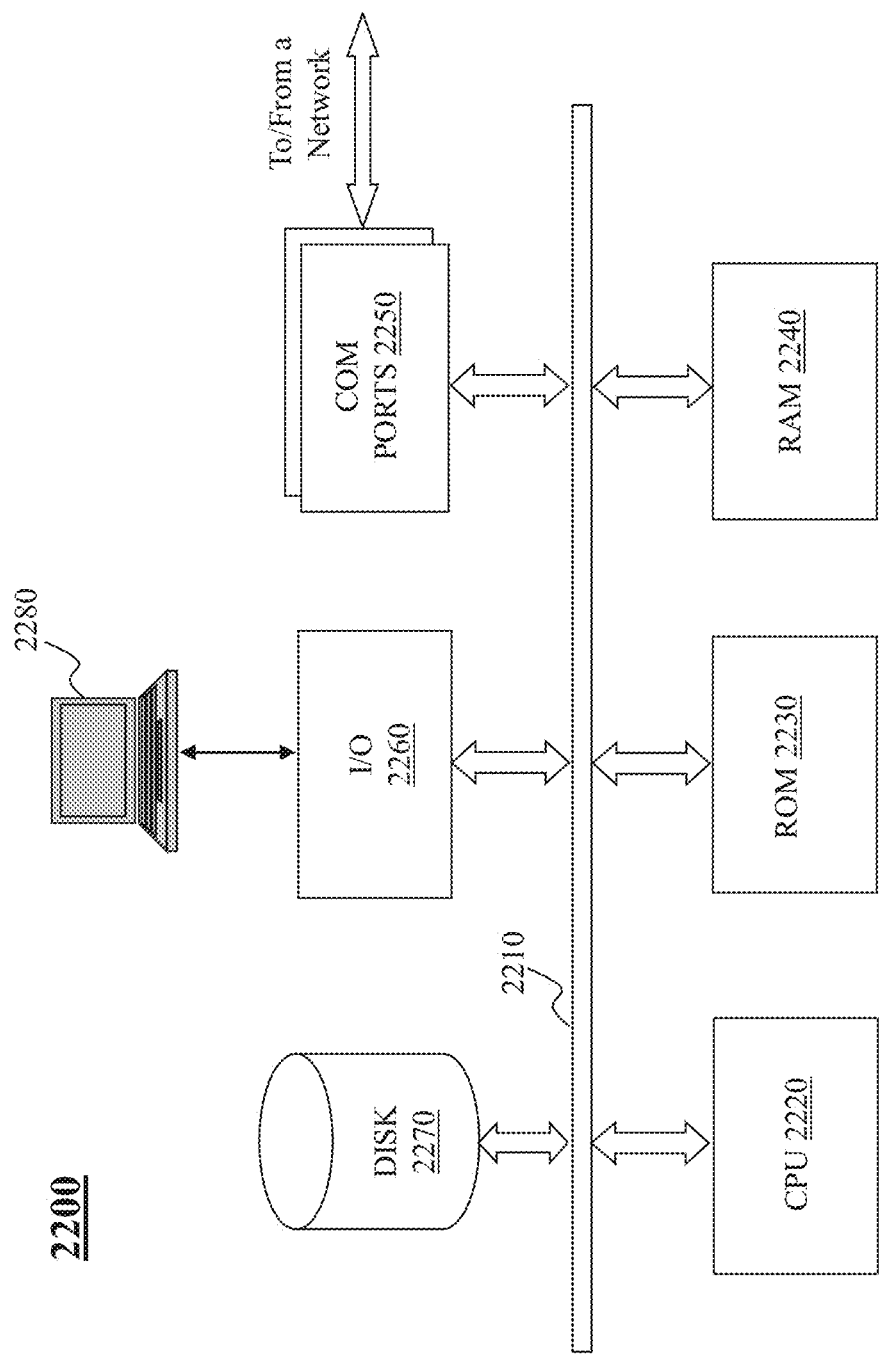
FIG. 22 is an illustrative diagram of an exemplary computing device architecture that may be used to realize a specialized system implementing the present teaching in accordance with various embodiments.

FIG. 22 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 2200 may be used to implement any component or aspect of the framework as disclosed herein. For example, the storage management system as disclosed herein may be implemented on a computer such as computer 2200, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 2200, for example, includes COM ports 2250 connected to and from a network connected thereto to facilitate data communications. Computer 2200 also includes a central processing unit (CPU) 2220, in the form of one or more processors, for executing program instructions. The exemplary computer platform includes an internal communication bus 2210, program storage and data storage of different forms (e.g., disk 2270, read only memory (ROM) 2230, or random-access memory (RAM) 2240), for various data files to be processed and/or communicated by computer 2200, as well as possibly program instructions to be executed by CPU 2220. Computer 2200 also includes an I/O component 2260, supporting input/output flows between the computer and other components therein such as user interface elements 2280. Computer 2200 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A hash table, comprising:
an index file having one or more slots, each of the one or more slots comprising one or more search regions, each of which is of a known size and has one or more buckets, wherein each of the one or more buckets stores one or more types of records, including a direct record and an indirect record, wherein
a direct record stores data directly in a bucket of a search region in a slot of the index file as direct data that fits in the bucket, and
an indirect record indicates indirect data that are not in the index file and provides information about a location where the indirect data are stored.

2. The hash table of claim 1, wherein
each of the one or more search regions in each of the one or more slots in the index file has a green zone, a yellow zone, and a red zone; and
rehashing of the index file is initiated when a certain condition, defined with respect to either the yellow zone or the red zone, is satisfied.

3. The hash table of claim 2, wherein
the certain condition with respect to the yellow zone is assessed based on a first flag indicative of an observation on whether at least one of the one or more search regions of the one or more slots is in the yellow zone, wherein the first flag is updated by proactively monitoring a status of the one or more search regions of the one or more slots of the index file.

4. The hash table of claim 2, wherein the rehashing comprises:
determining current space occupied by the index file;
determining additional space needed for a rehashed index file based on the current space and at least one rehashing parameter;
allocating the additional space which, when combined with the current space, forms a rehashed space to be occupied by the rehashed index file; and
iteratively rehashing the one or more slots in the index file to generate one or more corresponding rehashed slots of the rehashed index file.

5. The hash table of claim 4, wherein in each iteration, a second flag recording a current slot being rehashed is set to enable
data stored in each of the one or more slots that has been rehashed to be retrieved from a corresponding rehashed slot, and data stored in each of the one or more slots in the index file that has not yet been rehashed to be retrieved from the slot that is not yet rehashed.

6. The hash table of claim 2, wherein the rehashing is performed in one of a synchronous mode and an asynchronous mode, wherein
the rehashing is performed in the synchronous mode when processing a data storage request; and
the rehashing is performed in accordance with a first flag independent of data storage and data retrieval request.

7. The hash table of claim 1, further comprising an overflow file for storing data indexed by at least some records in the index file.

8. The hash table of claim 7, wherein the indirect record is one of a short indirect record and a long indirect record.

9. The hash table of claim 8, wherein
the short indirect record is a record that directs to a location for short indirect data that can be stored in one memory block; and
the long indirect record is a record that directs to a location for long indirect data that occupy more than one memory block.

10. The hash table of claim 9, wherein
the direct record specifies a first length of a key and a second length of a value included in the direct data to enable variable-length storage management of direct data;
the short indirect data provide a third length of a key and a fourth length of a value included in the short indirect data so that storage management for short indirect data is variable-length enabled; and
the long indirect data provide a fifth length of a key and a sixth length of a value included in the long indirect data so that storage management for long indirect data is variable-length enabled.

11. The hash table of claim 1, wherein the direct record includes direct data of a fixed length.

12. A method implemented on at least one processor, a memory, and a communication platform capable of variable length storage management, comprising:
constructing a hash table comprising an index file having one or more slots, each of the one or more slots comprising one or more search regions, each of which is of a known size and has one or more buckets, wherein each of the one or more buckets stores one or more types of records, including a direct record and an indirect record;
receiving a storage request associated with relevant data; and
handling the storage request based on the hash table, wherein
a direct record stores data directly in a bucket of a search region in a slot of the index file as direct data that fits in the bucket, and
an indirect record indicates indirect data that are not in the index file and provides information about a location where the indirect data are stored.

13. The method of claim 12, wherein each of the one or more search regions in each of the one or more slots in the index file has a green zone, a yellow zone, and a red zone and when a certain condition, defined with respect to either the yellow zone or the red zone, is satisfied, rehashing of the index file is initiated.

14. The method of claim 13, wherein the certain condition with respect to the yellow zone is assessed based on a first flag indicative of an observation on whether at least one of the one or more search regions of the one or more slots is in the yellow zone, wherein the first flag is updated by proactively monitoring a status of the one or more search regions of the one or more slots of the index file.

15. The method of claim 13, wherein the rehashing comprises:
determining current space occupied by the index file;
determining additional space needed for a rehashed index file based on the current space and at least one rehashing parameter;
allocating the additional space which, when combined with the current space, forms a rehashed space to be occupied by the rehashed index file; and
iteratively rehashing the one or more slots in the index file to generate one or more corresponding rehashed slots of the rehashed index file.

16. The method of claim 15, wherein in each iteration, a second flag recording a current slot being rehashed is set to enable
data stored in each of the one or more slots that has been rehashed to be retrieved from a corresponding rehashed slot, and
data stored in each of the one or more slots in the index file that has not yet been rehashed to be retrieved from the slot that is not yet rehashed.

17. The method of claim 13, wherein the rehashing is performed in one of a synchronous mode and an asynchronous mode, wherein
the rehashing is performed in the synchronous mode when processing a data storage request; and
the rehashing is performed in accordance with a first flag independent of data storage and data retrieval request.

18. The method of claim 12, wherein the hash table further comprises an overflow file for storing data indexed by at least some records in the index file.

19. The method of claim 18, wherein
the indirect record is one of a short indirect record and a long indirect record, wherein
the short indirect record is a record that directs to a location for short indirect data that can be stored in one memory block, and
the long indirect record is a record that directs to a location for long indirect data that occupy more than one memory block.

20. The method of claim 19, wherein
the direct record specifies a first length of a key and a second length of a value included in the direct data to enable variable-length storage management of direct data;
the short indirect data provide information about a third length of a key and a fourth length of a value included in the short indirect data to enable variable-length storage management of short indirect data; and
the long indirect data provide information about a fifth length of a key and a sixth length of a value included in the long indirect data to enable variable-length storage management of long indirect data.

21. The method of claim 12, wherein the direct record includes direct data of a fixed length.

22. Machine readable non-transitory medium having information recorded thereon for storage management, wherein the information, when read by a machine, causes the machine to perform the following:
constructing a hash table comprising an index file having one or more slots, each of the one or more slots comprising one or more search regions, each of which is of a known size and has one or more buckets, wherein each of the one or more buckets stores one or more types of records, including a direct record and an indirect record;

receiving a storage request associated with relevant data; and handling the storage request based on the hash table, wherein a direct record stores data directly in a bucket of a search region in a slot of the index file as direct data that fits in the bucket, and an indirect record indicates indirect data that are not in the index file and provides information about a location where the indirect data are stored.

23. The medium of claim 22, wherein each of the one or more search regions in each of the one or more slots in the index file has a green zone, a yellow zone, and a red zone and when a certain condition, defined with respect to either the yellow zone or the red zone, is satisfied, rehashing of the index file is initiated.

24. The medium of claim 23, wherein
the certain condition with respect to the yellow zone is assessed based on a first flag indicative of an observation on whether at least one of the one or more search regions of the one or more slots is in the yellow zone, wherein the first flag is updated by proactively monitoring a status of the one or more search regions of the one or more slots of the index file.

25. The medium of claim 23, wherein the rehashing comprises:
determining current space occupied by the index file;
determining additional space needed for a rehashed index file based on the current space and at least one rehashing parameter;
allocating the additional space which, when combined with the current space, forms a rehashed space to be occupied by the rehashed index file; and
iteratively rehashing the one or more slots in the index file to generate one or more corresponding rehashed slots of the rehashed index file.

26. The medium of claim 25, wherein in each iteration, a second flag recording a current slot being rehashed is set to enable data stored in each of the one or more slots that has been rehashed to be retrieved from a corresponding rehashed slot, and data stored in each of the one or more slots in the index file that has not yet been rehashed to be retrieved from the slot that is not yet rehashed.

27. The medium of claim 23, wherein the rehashing is performed in one of a synchronous mode and an asynchronous mode, wherein
the rehashing is performed in the synchronous mode when processing a data storage request; and
the rehashing is performed in accordance with a first flag independent of data storage and data retrieval request.

28. The medium of claim 22, wherein the hash table further comprises an overflow file for storing data indexed by at least some records in the index file.

29. The medium of claim 28, wherein
the indirect record is one of a short indirect record and a long indirect record, wherein
the short indirect record is a record that directs to a location for short indirect data that can be stored in one memory block, and
the long indirect record is a record that directs to a location for long indirect data that occupy more than one memory block.

30. The medium of claim 29, wherein
the direct record specifies a first length of a key and a second length of a value included in the direct data to enable variable-length storage management of direct data;
the short indirect data provide information about a third length of a key and a fourth length of a value included in the short indirect data to enable variable-length storage management of short indirect data; and
the long indirect data provide information about a fifth length of a key and a sixth length of a value included in the long indirect data to enable variable-length storage management of long indirect data.

31. The medium of claim 22, wherein the direct record includes direct data of a fixed length.

* * * * *